(12) United States Patent
Guo et al.

(10) Patent No.: US 12,346,355 B2
(45) Date of Patent: Jul. 1, 2025

(54) MATERIALIZED COLUMN CREATION METHOD AND DATA QUERY METHOD BASED ON DATA LAKE

(71) Applicant: Beijing Volcano Engine Technology Co., Ltd., Beijing (CN)

(72) Inventors: Jun Guo, Beijing (CN); Youjun Zhang, Beijing (CN); Yi Xu, Beijing (CN); Xuan Luo, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/740,895

(22) Filed: Jun. 12, 2024

(65) Prior Publication Data

US 2024/0330340 A1    Oct. 3, 2024

Related U.S. Application Data

(63) Continuation of application No. PCT/CN2023/088334, filed on Apr. 14, 2023.

(30) Foreign Application Priority Data

May 30, 2022    (CN) .......................... 202210603047.1

(51) Int. Cl.
*G06F 16/334*    (2025.01)
(52) U.S. Cl.
CPC .................................. *G06F 16/334* (2019.01)
(58) Field of Classification Search
CPC ...... G06F 16/213; G06F 9/451; G06F 9/4493; G06F 8/24
See application file for complete search history.

(56) References Cited

U.S. PATENT DOCUMENTS

| | | | | |
|---|---|---|---|---|
| 11,030,186 B2 * | 6/2021 | Cruanes | ............. | G06F 16/2282 |
| | | | | 707/602 |
| 2009/0024571 A1 * | 1/2009 | Thiyagarajan | .... | G06F 16/24539 |
| | | | | 707/999.002 |

(Continued)

FOREIGN PATENT DOCUMENTS

| | | |
|---|---|---|
| CN | 112347133 A | 2/2021 |
| CN | 112905595 A | 6/2021 |

(Continued)

OTHER PUBLICATIONS

China National Intellectual Property Administration, Office Action and Search Report Issued in Application No. 202210603047.1, Apr. 22, 2024, 8 pages.

(Continued)

*Primary Examiner* — Yuk Ting Choi
(74) *Attorney, Agent, or Firm* — Alleman Hall & Tuttle LLP

(57) ABSTRACT

Disclosed in the present application are a method of creating a materialized column based on a data lake and a method of querying data based on a data lake. In these methods, at least one materialized column can be created for a data table first, such that these materialized columns are used for storing data related to common columns in the data table, such that when a user subsequently triggers a data query request for a common column, a materialized column can replace the common column in feeding back the queried data to the user, and in this way, adverse effects caused when the queried data is fed back to the user directly by the common column can be effectively overcome, such that the data query effect can be effectively improved, and the information processing effect for such data tables can thus be effectively improved.

4 Claims, 9 Drawing Sheets

(56) References Cited

U.S. PATENT DOCUMENTS

| | | | | |
|---|---|---|---|---|
| 2013/0116237 A1* | 5/2013 | Fevig | ................ | A61P 17/02 514/211.09 |
| 2013/0332487 A1* | 12/2013 | Ramesh | ............. | G06F 16/2455 707/775 |
| 2015/0081616 A1* | 3/2015 | Kozin | ................ | G06F 16/2393 707/602 |
| 2017/0031975 A1* | 2/2017 | Mishra | ................ | G06F 16/2282 707/602 |
| 2017/0091315 A1* | 3/2017 | Finlay | ................ | G06F 16/221 707/602 |
| 2021/0019318 A1* | 1/2021 | Leung | ................ | G06F 16/2393 707/602 |
| 2021/0026851 A1* | 1/2021 | Kaul | ................ | G06F 16/24535 707/602 |
| 2021/0097444 A1* | 4/2021 | Bansal | ................ | G06F 9/546 707/602 |
| 2021/0109930 A1* | 4/2021 | Petride | ................ | G06F 16/2393 707/602 |
| 2022/0279051 A1* | 9/2022 | Khemka | ................ | H04L 67/53 707/602 |

FOREIGN PATENT DOCUMENTS

| | | |
|---|---|---|
| CN | 112925954 A | 6/2021 |
| CN | 113468174 A | 10/2021 |
| CN | 113468208 A | 10/2021 |
| CN | 114218261 A | 3/2022 |
| CN | 114969044 A | 8/2022 |

OTHER PUBLICATIONS

ISA China National Intellectual Property Administration, International Search Report Issued in Application No. PCT/CN2023/088334, May 22, 2023, WIPO, 3 pages.

\* cited by examiner

MATERIALIZED COLUMN CREATION METHOD AND DATA QUERY METHOD BASED ON DATA LAKE

CROSS-REFERENCE TO RELATED APPLICATION(S)

This application is a Continuation Application of International Patent Application No. PCT/CN2023/088334, filed Apr. 14, 2023, which claims priority to Chinese patent Application No. 202210603047.1, filed on May 30, 2022 to China National Intellectual Property Administration, entitled "MATERIALIZED COLUMN CREATION METHOD AND DATA QUERY METHOD BASED ON DATA LAKE", the disclosures of which are incorporated herein by reference in its entity.

FIELD

The present application relates to a field of information processing technology, particularly to a method of creating a materialized column based on a data lake, a method of writing data, a method of querying data, an apparatus of creating a materialized column, an apparatus of writing data, an apparatus of querying data, an information processing system, an electronic device, a computer-readable medium, and a computer program product.

BACKGROUND

With the development of information technology, there is an increasing demand for information processing, and the number of devices used to achieve information processing is also growing. In order to facilitate understanding, the following is explained in conjunction with examples.

As an example, in certain application scenarios, Online Analytical Processing-based (OLAP-based) devices (e.g., some native OLAP engines etc.) can be utilized to realize some information processing processes (e.g., information processing processes such as data storage, data query).

However, due to the shortcomings of some OLAP-based devices, the information processing effect of these devices is relatively poor.

SUMMARY

In order to solve the technical problem above, the present application provides a method of creating a materialized column based on a data lake, a method of writing data, a method of querying data, an apparatus of creating a materialized column, an apparatus of writing data, an apparatus of querying data, an information processing system, an electronic device, a computer-readable medium, and a computer program product, which can improve the information processing effect.

In order to achieve the objectives above, the technical solution provided by the embodiments of the present application is as follows:

The embodiments of the present application provide a method of creating a materialized column based on a data lake. The method comprises: acquiring a materialized column creation request triggered by a first user, wherein the materialized column creation request is for requesting to create a first materialized column in a first data table, the materialized column creation request carries a materialized expression of the first materialized column, and the materialized expression is for describing a data association relationship between the first materialized column and a target column in the first data table; and creating the first materialized column according to the materialized column creation request, wherein the first materialized column is used to replace the target column in providing data for a data query request carrying the materialized expression.

The embodiments of the present application provide a method of writing data based on a data lake. The method comprises: acquiring a first data writing request triggered by a second user, wherein the first data writing request is for requesting to write data into a second data table, and the first data writing request carries data column description information for the second data table; rewriting, in accordance with a determination that the data column description information satisfies a preset expansion condition, and a determination that at least one second materialized column exists in the second data table, the first data writing request based on a materialized expression of the at least one second materialized column to obtain a second data writing request, wherein the second materialized column is created using any of the implementations of the method of creating the materialized column based on the data lake provided by the embodiments of the present application; and performing data writing on the second data table according to the second data writing request.

The embodiments of the present application provide a method of querying data based on a data lake. The method comprises: acquiring a first data query request triggered by a third user, wherein the first data query request is for requesting data query on a third data table; rewriting, in accordance with a determination that at least one third materialized column exists in the third data table, the first data query request using materialized column description information of the at least one third materialized column to obtain a second data query request, wherein the third materialized column is created using any of the implementations of the method of creating the materialized column based on the data lake provided by the embodiments of the present application; and performing data query on the third data table according to the second data query request.

The embodiments of the present application provide an apparatus of creating a materialized column based on a data lake. The apparatus comprises: a first acquisition unit configured to acquire a materialized column creation request triggered by a first user, wherein the materialized column creation request is for requesting to create a first materialized column in a first data table, the materialized column creation request carries a materialized expression of the first materialized column, and the materialized expression is for describing a data association relationship between the first materialized column and a target column in the first data table; and a materialized column creation unit configured to create the first materialized column according to the materialized column creation request, wherein the first materialized column is used to replace the target column in providing data for a data query request carrying the materialized expression.

The embodiments of the present application provide an apparatus of writing data based on a data lake. The apparatus comprises: a second acquisition unit configured to acquire a first data writing request triggered by a second user, wherein the first data writing request is for requesting to write data into a second data table, and the first data writing request carries data column description information for the second data table; a first rewriting unit configured to rewrite, in accordance with a determination that the data column description information satisfies a preset expansion condition, and a determination that at least one second materialized column exists in the second data table, the first data writing request based on a materialized expression of the at least one second materialized column to obtain a second data writing request, wherein the second materialized column is created using any of the implementations of the method of creating the materialized column based on the data lake provided by the embodiments of the present application; and a data writing unit configured to perform data writing on the second data table according to the second data writing request.

The embodiments of the present application provide an apparatus of querying data based on a data lake. The apparatus comprises: a third acquisition unit configured to acquire a first data query request triggered by a third user, wherein the first data query request is for requesting data query on a third data table; a second rewriting unit configured to rewrite, when at least one third materialized column exists in the third data table, the first data query request using materialized column description information of the at least one third materialized column to obtain a second data query request, wherein the third materialized column is created using any of the implementations of the method of creating the materialized column based on the data lake provided by the embodiments of the present application; and a data querying unit configured to perform data query on the third data table according to the second data query request.

The embodiments of the present application provide an information processing system based on a data lake. The system comprises an information processing layer, wherein the information processing layer is configured to execute any of the implementations of the method of creating the materialized column based on the data lake provided by the embodiments of the present application, or execute any of the implementations of the method of writing data based on the data lake provided by the embodiments of the present application, or execute any of the implementations of the method of querying data based on the data lake provided by the embodiments of the present application.

The embodiments of the present application provide an electronic device. The device comprises a processor and a memory. The memory is configured to store instructions or computer programs. The processor is configured to execute the instructions or computer programs stored in the memory to cause the electronic device to execute any of the implementations of the method of creating the materialized column based on the data lake provided by the embodiments of the present application, or execute any of the implementations of the method of writing data based on the data lake provided by the embodiments of the present application, or execute any of the implementations of the method of querying data based on the data lake provided by the embodiments of the present application.

The embodiments of the present application provide a computer-readable medium, having stored thereon instructions or computer programs which, when the instructions or computer programs are run on a device, cause the device to execute any of the implementations of the method of creating the materialized column based on the data lake provided by the embodiments of the present application, or execute any of the implementations of the method of writing data based on the data lake provided by the embodiments of the present application, or execute any of the implementations of the method of querying data based on the data lake provided by the embodiments of the present application.

The embodiments of the present application provide a computer program product which, when run on a terminal device, causes the terminal device to execute any of the implementations of the method of creating the materialized column based on the data lake provided by the embodiments of the present application, or execute any of the implementations of the method of writing data based on the data lake provided by the embodiments of the present application, or execute any of the implementations of the method of querying data based on the data lake provided by the embodiments of the present application.

The embodiments of the present application provide at least the following advantages over the prior art:

in the technical solution provided by the embodiments of the present application, at least one materialized column may be created for a data table to cause these materialized columns to be used to store some data related to common columns (e.g., high-frequency subcolumns such as "people.age" below) in the data table, so that when a user subsequently triggers a data query request for the common column, the materialized column is used to replace the common column in feeding the user back with the queried data, which can effectively overcome the adverse effects (e.g., wasted IO resources, additional calculations added etc.) caused when the queried data is directly fed back to the user from the common column, thus effectively improving the effect of data querying, and thus effectively improving the effect of information processing for these data tables.

BRIEF DESCRIPTION OF THE DRAWINGS

In order to more clearly describe the technical solutions in the embodiments of the present application or the prior art, the drawings needed to be used in the description of the embodiments or the prior art will be briefly introduced below. Obviously, the drawings in the following description are only some embodiments disclosed in the present application, and those of ordinary skill in the art may also obtain other drawings based on these drawings without exerting creative efforts.

DETAILED DESCRIPTION OF EMBODIMENTS

In a research concerning OLAP-based devices (e.g., some native OLAP engines), it was discovered by the inventors that these devices exhibit relatively poor performance in processing semi-structured data. The semi-structured data may include Map type data, Struct type data, Array type data, JSON (JavaScript Object Notation) type data, etc. In order to facilitate understanding, the following is explained in conjunction with examples.

As an example, for a native OLAP engine, when it attempts to read a certain sub-column (e.g., the sub-column "people.age" shown in FIG. 1) of a certain nested type data column (e.g., the nested type data column "people" shown in FIG. 1), it usually needs to load all the nested type data columns into the memory first; then, the native OLAP engine extracts the sub-column to be queried from the memory. In order to facilitate understanding, this will be explained in more detail below in conjunction with FIG. 1.

Figure 1:
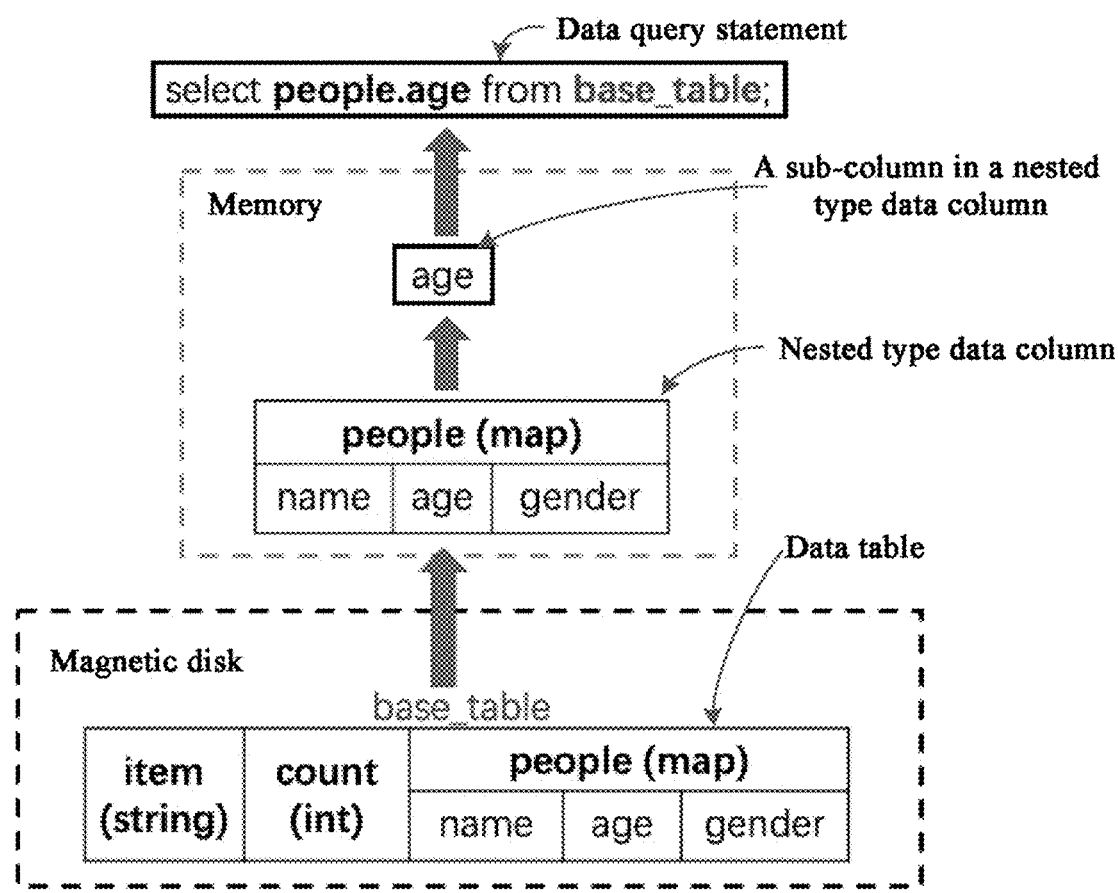
FIG. 1 is a schematic diagram of a data query process provided by an embodiment of the present application.

As shown in FIG. 1, for a data table named base_table, the data table includes three columns: item, count, and people; and, the data column named people in the data table is of Map type, including three sub-columns of atomic type: name, age, and gender. Thus, if a user intends to query data under the sub-column people.age, the native OLAP engine first loads the data column named people entirely into memory from the disk; then, the native OLAP engine extracts the sub-column named age from the data columns stored in memory; finally, the native OLAP engine feeds back this sub-column to the user.

It should be noted that, FIG. 1 illustrates the following terms: disk; memory; base_table; item; count; people; name; age; gender. Additionally, the string "select people.age from base_table" shown in FIG. 1 is a data query statement, indicating querying the sub-column named age of the data column named people from the data table named base_table. Moreover, "item", "count", "people", "name", "age", and "gender" shown in FIG. 1 are all column names of data columns. Furthermore, "map" as shown in FIG. 1 is for indicating that the data column named people belongs to the Map type; "int" is for indicating that the data column named count belongs to the int type (i.e., the INTERGER type); and "string" is for indicating that the data column named item belongs to the string type (i.e., the STRING type).

Based on the examples above and the related content in FIG. 1, it can be seen that the native OLAP engine has the following defects in a reading process of a certain sub-column of a nested type data column:

(1) An increase in a large amount of invalid Input/Output (IO). In other words, even if the native OLAP engine only queries one sub-column, the native OLAP engine also needs to read the data of the entire nested type data column which includes the sub-column into memory. According to actual measurements, about 80% of invalid IOs exist, which results in a large amount of waste of IO resources.

(2) An increase in additional computation. In other words, each time a query involves a nested type data column (e.g., querying a certain sub-column of the nested type data column etc.), the native OLAP engine needs to perform parsing computations on the nested type data column, resulting in a waste of a large amount of computational resources.

(3) Lack of support for Filter Pushdown from the nested type. For example, for a filter statement for selecting the group of people with an age greater than 10, such as "where people.age>10", although the sub-column "people.age" in the data table belongs to the atomic type, the native OLAP engine cannot directly read and filter the sub-column, but instead, the native OLAP engine typically first loads the data column named people entirely into memory from the disk; then, the native OLAP engine extracts the sub-column named age from the data column stored in memory; finally, the native OLAP engine selects the data that satisfies the condition "age>10" from this sub-column.

(4) Inability to perform vectorized reading. In other words, because the native OLAP engine typically only supports vectorized reading for data columns of atomic type, but not for data columns of nested type, the reading performance of the native OLAP engine is relatively poor.

Figure 2:
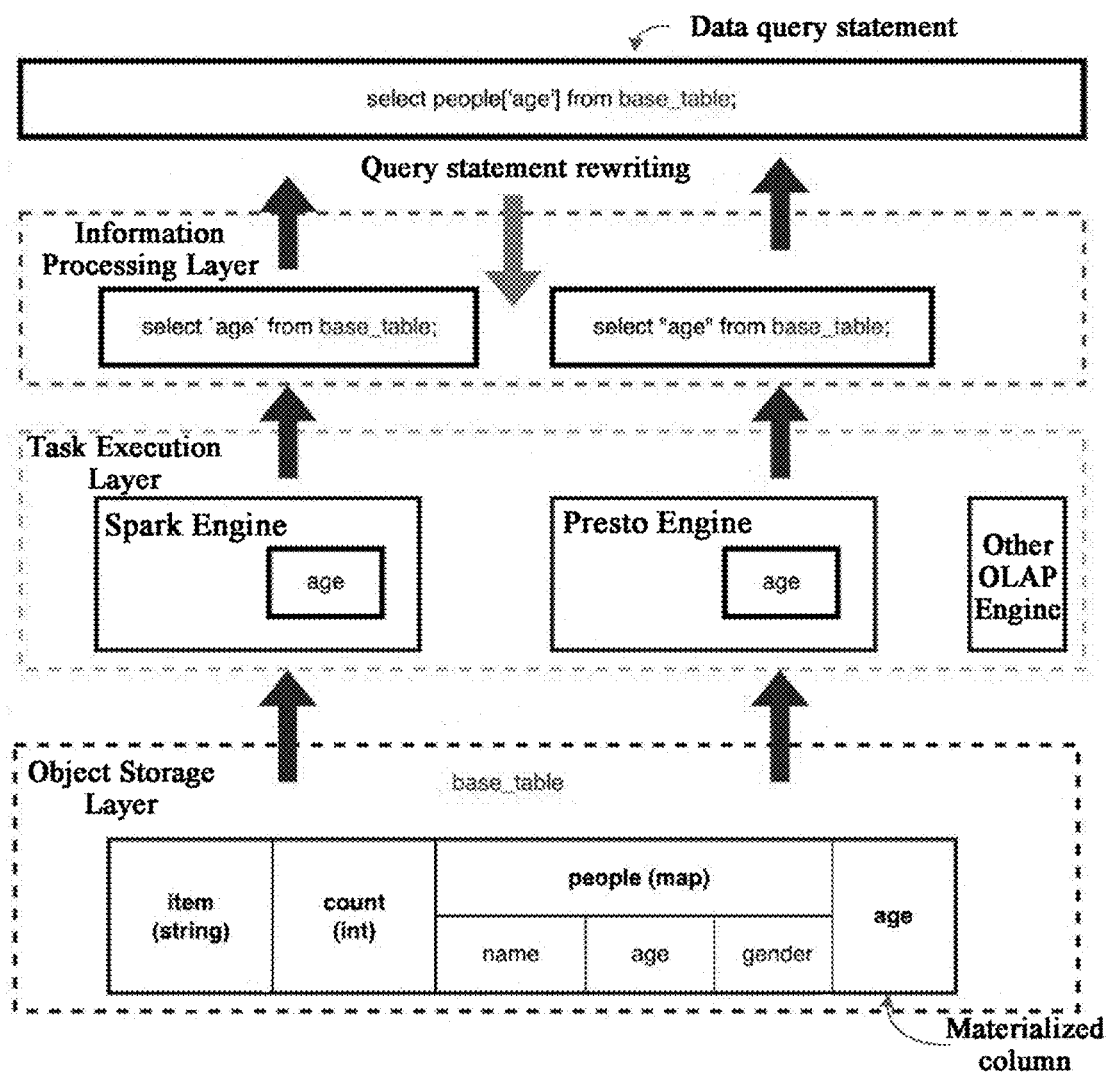
FIG. 2 is a schematic diagram of another data query process provided by an embodiment of the present application.

Based on the findings above, in order to solve the technical problem shown in the BACKGROUND part, the embodiments of the present application provide a solution based on materialized columns (e.g., the solution as shown in FIG. 2), which specifically is: creating at least one materialized column (e.g., the data column named "age" shown in FIG. 2) for a data table (e.g., the data table named base_table shown in FIG. 1) at first, so that these materialized columns are used to store data related to common columns (e.g., a high-frequency sub-column, such as a sub-column named age, of a data column named people as shown in FIG. 1) in the data table. So that when a user subsequently triggers a data query request on the common column, the data queried by the user can be fed back to the user by the materialized column rather than the common column, so as to effectively overcome the undesirable effects (e.g., wasted IO resources, wasted computational resources etc.) caused when the data queried by the user is fed directly by the common column to the user, so as to effectively improve the effect of data querying, and thus effectively improve the effect of information processing for these data tables. Therein please see below for the relevant content of the materialized columns. Common columns refer to other data columns in the data table except the materialized columns. High-frequency sub-columns refer to data columns in the data table that are frequently queried by users.

In order to enable those in the technical field to better understand the solution of the present application, the technical solution of the embodiments of the present application will be clearly and completely described below in conjunction with the accompanying drawings in the embodiment of the present application. Obviously, the described embodiments are only some of the embodiments of the present application, rather than all of the embodiments. Based on the embodiments in the present application, all other embodiments obtained by those of ordinary skill in the art without creative efforts fall within the protection scope of the present application.

In order to better understand the technical solution of the present application, the technical solution of the present application will be described below in three parts: a creation process of materialized column, a writing process of materialized column, and a query process of materialized column.

Creation Process of Materialized Column

In fact, a materialized column in a data table is a common column associated with a materialized expression per se, which enables the materialized column to express its association relationship with a certain common column in the data table (e.g., association relationships such as equality). It can be seen that, compared with the creation process of a common column, during the creation process of the materialized column, a materialized expression needs to be specified for it, so that the materialized expression can express the association relationship between the materialized column and a certain data column in the data table.

Figure 3:
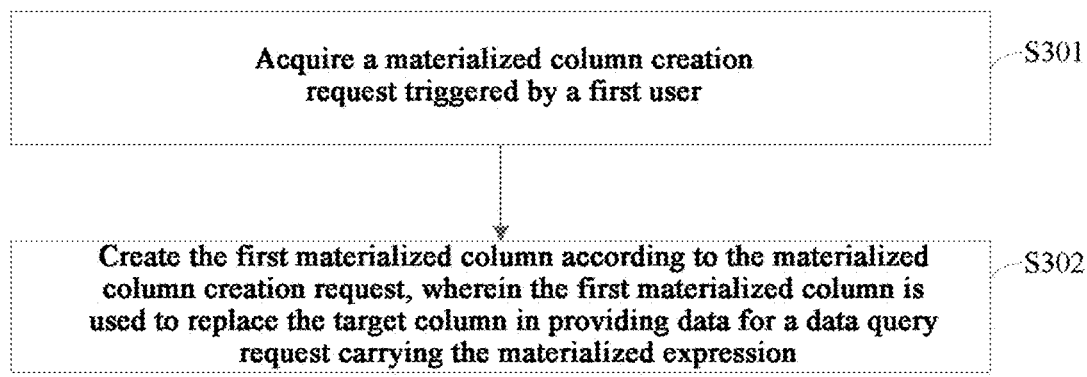
FIG. 3 is a flow chart of a method of creating a materialized column based on a data lake provided by an embodiment of the present application.

Based on this, the embodiments of the present application provide a method of creating a materialized column based on a data lake. The method comprises S301-S302 (as shown in FIG. 3):

At S301, a materialized column creation request triggered by a first user is acquired.

Here, the term "first user" is for representing a person with a demand to create a materialized column, and the embodiments of the present application do not limit this "first user".

The materialized column creation request is for requesting to create a first materialized column in a first data table; and the materialized column creation request carries a materialized expression of the first materialized column, allowing the materialized expression to describe a data association relationship between the first materialized column and a target column in the first data table.

The term "first data table" refers to the data table in which a materialized column needs to be created, and the embodiments of the present application do not limit this "first data table". For example, it may be the data table named base_table as shown in FIG. 1.

The term "first materialized column" refers to a data column with a materialized expression associated with it that needs to be created in the first data table, allowing the first materialized column to have a data association relationship (e.g., association relationships such as equality or having a preset numerical difference) with a target column in the first data table. For example, when the first data table is the data table named base_table as shown in FIG. 1, and the target column is the sub-column named age of the data column named people in FIG. 1, the first materialized column may be the data column named age as shown in FIG. 2, and the data association relationship between the first materialized column and the target column is equality of data, allowing the first materialized column to be directly used to replace the target column, subsequently.

The term "materialized expression of the first materialized column" is for representing the data association relationship between the first materialized column and the target column in the first data table. For example, when the first materialized column is the data column named age as shown in FIG. 2, and the target column is the sub-column named age in the data column named people as shown in FIG. 1, the materialized expression of the first materialized column can indicate that the data in the first materialized column equals the data in the target column.

The term "target column" refers to the data column in the first data table that has a data association relationship with the first materialized column (e.g., the data column named item as shown in FIG. 1, or the sub-column named age within the data column named people as shown in FIG. 1, etc.), and the materialized expression of the first materialized column includes a description of the target column (e.g., data column identifiers such as "people.age"). The data column identifier is for uniquely identifying a data column, and the embodiments of the present application do not limit this data column identifier. For example, it may include the column name of the data column. Additionally, if the data column is a sub-column of a certain nested type data column, the data column identifier may not only include the column name of the sub-column, but also include the column name of the nested type data column.

Furthermore, the embodiment of the present application does not limit the materialized column creation request. For example, it may be a materialized column creation statement, so that the materialized column creation statement can express the user demand to create the first materialized column in the first data table.

In fact, in order to meet the materialized column creation demand, the embodiments of the present application further provide a materialized column creation syntax (such as the materialized column creation syntax as shown in Table 1), and the materialized column creation syntax is specifically: adding a new materialized column keyword (e.g., MATERIALIZED) to the original data column creation syntax (such as the original data column creation syntax as shown in Table 1), so that the materialized column keyword can be used to specify the materialized expression.

TABLE 1

Comparison between original data column creation syntax and materialized column creation syntax

| | |
|---|---|
| Original data column creation syntax (before modification) | columnName dataType [COMMENT STRING] |
| Materialized column creation syntax (after modification) | columnName dataType [MATERIALIZED expression] [COMMENT STRING] |

It should be noted that, for Table 1, the string "columnName" is for representing the column name of a data column; the string "dataType" is for representing the data type of a data column; the string "[COMMENT STRING]" is for representing the comment information of a data column; "MATERIALIZED" is for representing the materialized column keyword; "expression" is for representing the materialized expression.

In fact, to enhance user experience, a first user may use materialized column creation syntax in the two scenarios illustrated in Table 2 below.

Figure 4:
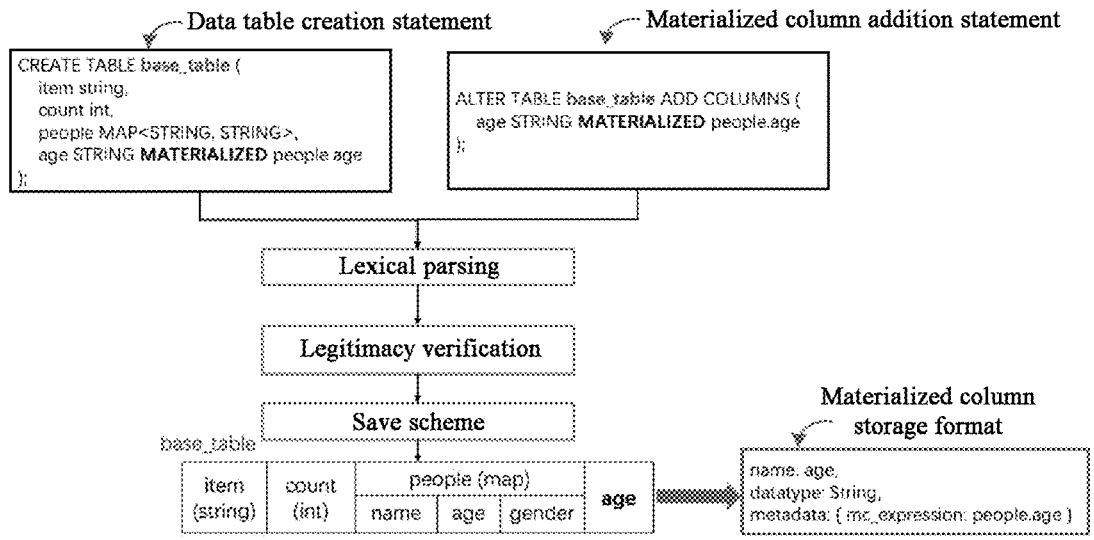
FIG. 4 is a schematic diagram of a materialized column creation statement provided by an embodiment of the present application.

Based on the relevant content of the materialized column creation syntax above, when a first user intends to create a first materialized column in a first data table, the first user may input the corresponding materialized column creation statement (e.g., the data table creation statement shown in the upper left corner of FIG. 4, or the materialized column addition statement shown in the upper right corner of FIG. 4 etc.) on the corresponding user interface according to the materialized column creation syntax, so that the materialized column creation statement can express the user demand to create the first materialized column in the first data table. In order to facilitate understanding, the following is explained in conjunction with two examples. The user interface corresponding to the first user refers to an interface that allows the first user to input a materialized column creation statement.

Example 1: When a first user intends to create a first materialized column while creating a first data table, where the first data table is the data table named base_table as shown in FIG. 2, and the first materialized column is the materialized column named age as shown in FIG. 2, the first user may input the data table creation statement shown in the upper left corner of FIG. 4 on the corresponding user interface, to express the user demand to create the first materialized column while creating the first data table.

Example 2: When a first user intends to add a first materialized column into an already created first data table, where the first data table is the data table named base_table already stored in the disk as shown in FIG. 1, and the first materialized column is the materialized column named age as shown in FIG. 2, the first user may input the materialized column addition statement shown in the upper right corner of FIG. 4 on the corresponding user interface to express the user demand to create the first materialized column in the existing first data table.

Furthermore, the embodiments of the present application do not limit the acquisition manners of the materialized column creation request. For example, the execution subject of the method of creating the materialized column based on the data lake provided by the embodiments of the present application is the information processing layer in the "information processing system based on the data lake" below, and the information processing layer includes a user interface oriented to the first user, the information processing layer may acquire the materialized column creation request triggered by the first user from the user interface.

Based on the relevant content of S301 above, if the first user intends to create a first materialized column associated with a certain data column in the first data table, the first user can trigger a materialized column creation request on the corresponding user interface, so that the materialized column creation request can express the user demand to create the first materialized column in the first data table, enabling the execution subject of the method of creating the materialized column based on the data lake provided by the embodiments (e.g., the "information processing layer" below, etc.) to interpret the user demand from the materialized column creation request.

At S302, the first materialized column is created according to the materialized column creation request, wherein the first materialized column is used to replace the target column

TABLE 2

Two usage scenarios of materialized column creation syntax

| Usage scenario of materialized column creation syntax | Creation statement | Statement interpretation |
|---|---|---|
| Creating a materialized column while creating a data table | CREATE TABLE base_table ( <br>   people MAP<STRING, STRING>, <br>   age STRING MATERIALIZED people.age <br> ); | Creating a data table named base_table; and the data table includes a data column named people that belongs to the Map type, and a materialized column named age. |
| Adding a materialized column into an existing table | CREATE TABLE base_table ( <br>   people MAP<STRING, STRING> <br> ); <br> ALTER TABLE base_table ADD COLUMNS( <br>   age STRING MATERIALIZED people.age <br> ); | Firstly, creating a data table named base_table; and the data table includes a data column named people that belongs to the Map type. Subsequently, adding a materialized column named age into the data table named base_table. |

Based on the relevant content of the materialized column creation statement above, in some scenarios, if a first user intends to create a first materialized column in a first data table, the first user may follow preset syntax rules (e.g., the materialized column creation syntax as shown in Table 1) to compose corresponding materialized column creation statements, so that the materialized column creation statement can express the user demand to create the first materialized column in the first data table, thus achieving the purpose of expressing user demands through some statements.

Additionally, the embodiments of the present application do not limit the triggering manner of the materialized column creation request. For example, any existing or future triggering manners may be used for implementation. For another example, when a materialized column creation request is a materialized column creation statement, the first user may trigger the materialized column creation request by inputting the materialized column creation statement on the corresponding user interface.

in providing data for a data query request carrying the materialized expression of the first materialized column.

In the embodiments of the present application, after acquiring the materialized column creation request, the first materialized column may be created in the first data table according to the materialized column creation request, so that the first data table includes the first materialized column to enable the first materialized column to be used as a data column in the first data table to respond to a data query request triggered for the first data table (e.g., some data query requests carrying the materialized expression of the first materialized column etc.). Because the first materialized column has a data association relationship with the target column in the first data table, in some cases (e.g., the case where a data query request carries the materialized expression of the first materialized column, etc.), the first materialized column can replace the target column in responding to a data query request for the first data table, so as to effectively avoid the adverse effects caused by the inconvenience of reading the target column, thereby effectively improving the data query efficiency, which in turn is conducive to improving the effect of information processing.

In fact, the essence of creating the materialized column is to store the materialized column in the storage space. Based on this, the embodiments of the present application further provide a possible implementation of S302, which may specifically be as follows: based on the materialized column description information of the first materialized column carried by the materialized column creation request, the first materialized column is created in the data storage space to cause the first materialized column to be stored in the data storage space.

The materialized column description information of the first materialized column is for describing the first materialized column. The embodiments of the present application do not limit the materialized column description information. For example, it may include at least one of a materialized column identifier of the first materialized column (e.g., the column name "age" as shown in FIG. 4), the data type of the first materialized column (e.g., "STRING" as shown in FIG. 4), or the materialized expression of the first materialized column (e.g., "people.age" as shown in FIG. 4).

The term "data storage space" above refers to space for storing data tables, and the embodiments of the present application do not limit this data storage space. For example, the data storage space may be the disk as shown in FIG. 1.

In fact, the materialized expression is a kind of description information specific to the materialized column that is obviously different from common columns (i.e., traditional data columns). However, how to store the materialized expression of a materialized column has become an urgent technical problem that needs to be solved. Additionally, the inventors found in the research on the data table that each data column corresponds to a Map type metadata (metadata); and if declaration information is specified when creating a data column (e.g., COMMENT 'this is a materialized column' as shown in FIG. 5), the declaration information will be stored in the metadata of this column in the format of key-value pairs (e.g., the storage result as shown in FIG. 5).

Figure 6:
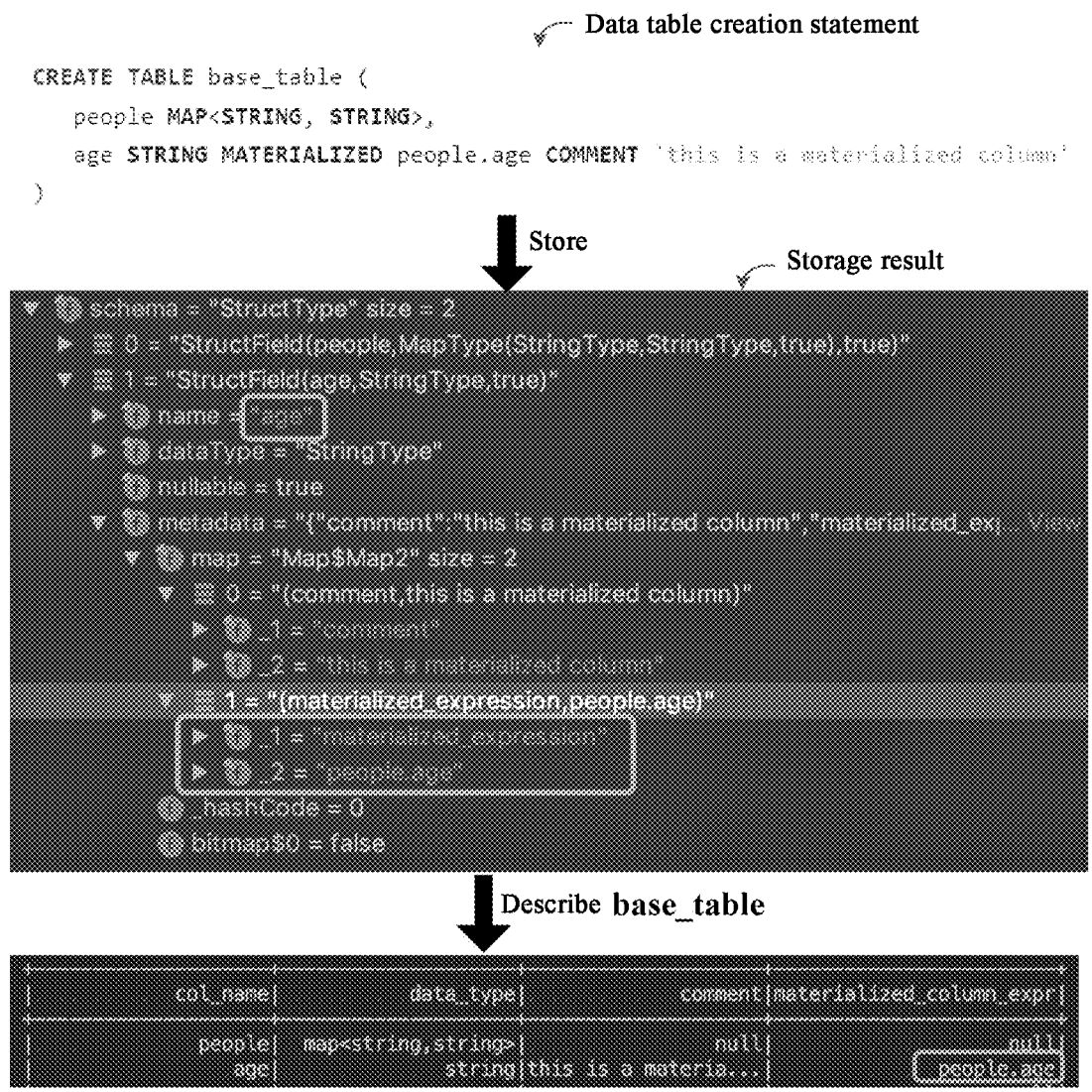
FIG. 6 is a schematic diagram of a storage format of a materialized expression provided by an embodiment of the present application.

The inventors also found that storage of materialized expressions (as shown in FIG. 6) may be implemented by referring to the storage manner of the declaration information above. Based on this, the embodiments of the present application provide a storage process for materialized expressions, which may specifically include: first creating the metadata of the first materialized column in the data storage space, so that the metadata of the first materialized column is stored in the data storage space; and then storing the materialized expression of the first materialized column in metadata in a predefined description format (e.g., a format of key-value pair, etc.), so that the metadata includes the materialized expression of the first materialized column, so that the materialized expression of the first materialized column is stored in the data storage space, so that the purpose of storing the materialized expression specific to the materialized column can be achieved.

Figure 5:
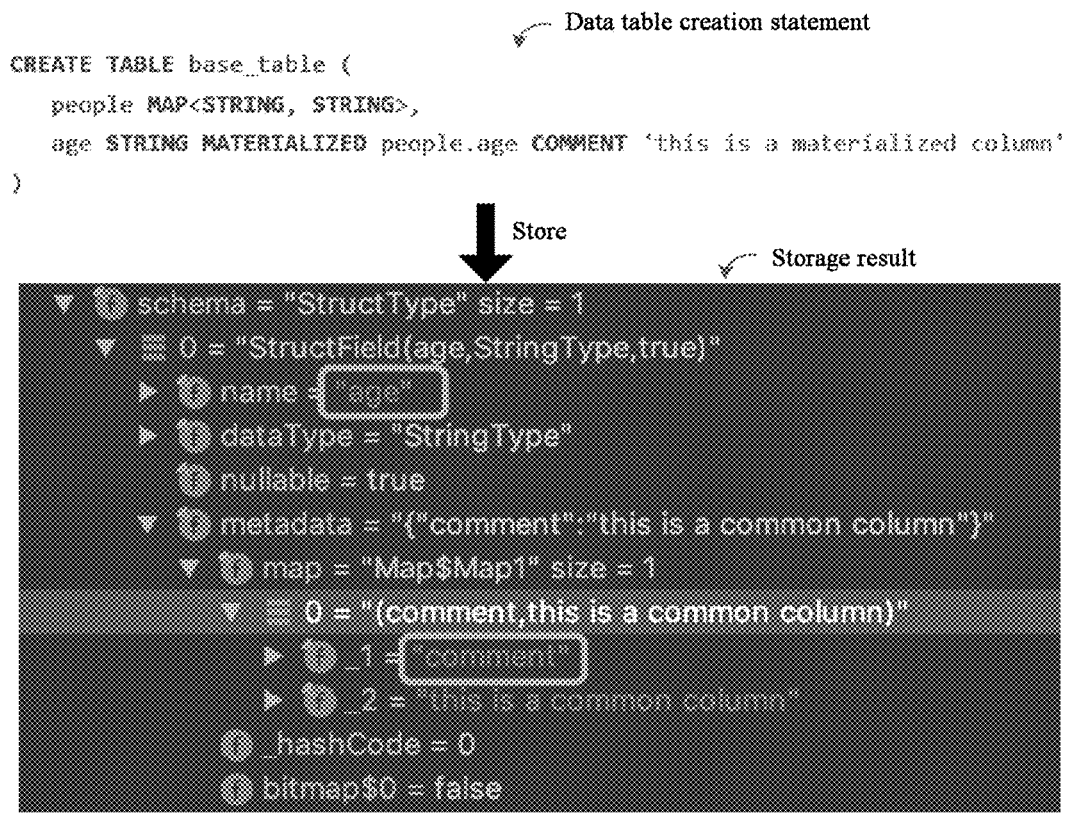
FIG. 5 is a schematic diagram of a storage format of data column declaration information provided by an embodiment of the present application.

It can be seen that in the embodiments of the present application, the storage format of the declaration information shown in FIG. 5 may be referred to, in order to realize the storage of the materialized expression of a materialized column (storage as shown in FIG. 6), so that the materialized expression of each materialized column is stored in the metadata of the materialized column, which not only enables the storage of materialized expressions, but also achieves the purpose of information association (i.e., associating a materialized column with the materialized expression of the materialized column), so that the materialized column and the common column may be distinguished subsequently by judging whether the key of materialized_expression exists in the metadata of a data column.

Based on the relevant content of S301 to S302 above, for the method of creating the materialized column based on the data lake provided by the embodiments of the present application, after acquiring the materialized column creation request triggered by the first user, the first materialized column is created in the first data table according to the materialized column creation request, so that the first data table includes the first materialized column, thereby realizing the user demand for creating the first materialized column in the first data table as expressed by the materialized column creation request. Because the first materialized column in the first data table has a data association relationship with the target column in the first data table, in some cases the first materialized column is able to replace the target column in responding to the data query request triggered for the first data table, so as to effectively avoid the undesirable effects caused by the inconvenience of reading the target column, thereby effectively improving the efficiency of querying for the data, and thereby contributing to the improvement of the effect of the information processing.

In fact, in some scenarios (e.g., OLAP scenarios, etc.), different information processing devices have their own unique language characteristics (e.g., various OLAP engines have their own dialects), which means that when a first user intends to execute a task (e.g., materialized column creation task, etc.) using different information processing devices, the first user needs to express the task in the dialect of each information processing device, resulting in relatively low task triggering efficiency and poor user experience.

To overcome the problem above, the embodiments of the present application provide another possible implementation of the method of creating the materialized column based on the data lake. In this implementation, the method of creating the materialized column may be executed by means of the information processing system 700 based on the data lake shown in FIG. 7, and the execution process may specifically include steps 21 to 22.

At step 21, the information processing layer 701 acquires the materialized column creation request triggered by the first user.

It should be noted that for the relevant content of step 21, please refer to S301 above.

Based on the relevant content of step 21, if the first user intends to create a first materialized column associated with a certain data column in the first data table, the first user may trigger the materialized column creation request on the user interface provided by the information processing layer 701 for the first user so that the materialized column creation request can express a user demand to create the first materialized column in the first data table so that the information processing layer 701 can interpret the user demand from the materialized column creation request.

At step 22, the information processing layer 701 creates the first materialized column according to the materialized column creation request.

It should be noted that for the relevant content of step 22, please refer to S302 above.

In fact, the information processing layer 701 may implement the creation process for the first materialized column by means of the task execution layer 702 that includes a plurality of task execution devices. Based on this, the embodiments of the present application further provide a possible implementation of the creation process for the first materialized column, which may specifically include steps 221 to 225:

At step 221, the information processing layer 701 acquires the materialized column creation device description information.

The materialized column creation device description information is for describing a task execution device capable of performing the task of creating the first materialized column (e.g., a certain OLAP engine in the task execution layer 702 etc.).

In addition, the embodiments of the present application do not limit the materialized column creation device description information. For example, the materialized column creation device description information may include device description information (e.g., device identifier etc.) of a task execution device capable of performing the task of creating the first materialized column. The device identifier is for uniquely representing the task execution device (e.g., OLAP engine etc.) in the task execution layer 702. Moreover, the embodiments of the present application do not limit the device identifier. For example, the device identifier may be a device name (e.g., "Spark Engine" as shown in FIG. 2, etc.).

In addition, the embodiment of the present application does not limit the acquisition process of the materialized column creation device description information (i.e., the implementation of step 221). In order to facilitate understanding, the following is explained in conjunction with two situations.

Situation 1: The first user can directly specify which task execution device in the task execution layer 702 will execute the task of creating the first materialized column.

To meet the user demand shown in Situation 1, the embodiments of the present application further provide another possible implementation of the aforementioned "materialized column creation request". In this implementation, the materialized column creation request not only includes the column name of the first materialized column, data type of the first materialized column, and materialized expression of the first materialized column, but may also include the materialized column creation device description information of the first materialized column, so that the information processing layer 701 can subsequently learn from the materialized column creation request which task execution device in the task execution layer 702 the first user intends to use to perform the task of creating the first materialized column.

It can be seen that when the "materialized column creation request" above carries the materialized column creation device description information of the first materialized column, step 221 may specifically be: after the information processing layer 701 acquires the materialized column creation request triggered by the first user, the information processing layer 701 extracts the materialized column creation device description information from the materialized column creation request, so that the materialized column creation device description information is for indicating which task execution device in the task execution layer 702 the first user intends to use to perform the task of creating the first materialized column, thereby achieving the purpose of specifying the materialized column creation device by the user, which is conducive to improving the user experience.

Situation 2: The information processing layer 701 can preset a default execution device for executing the task of creating the materialized column, so that when the first user does not specify the task execution device for executing the task of creating the first materialized column, the information processing layer 701 can select the task execution device for this task as reasonably as possible.

To meet the service demand shown in Situation 2, the embodiments of the present application further provide an implementation for the information processing layer 701. In this implementation, the information processing layer 701 stores a preset mapping relationship to record the default execution devices corresponding to various request types. The embodiments of the present application do not limit this preset mapping relationship. For example, it may include the correspondence shown in Table 3 below.

TABLE 3

Various request types and their corresponding default execution devices

| Request type | Preset default execution device for request type |
|---|---|
| First request type (i.e., a request to create a materialized column) | Spark engine |
| Second request type (i.e., a request to write data into the data table) | Spark engine |
| Third request type (i.e., a request for a data query on a certain data table with small workload) | Presto engine |
| Fourth request type (i.e., a request for a data query on a certain data table with large workload) | Spark engine |

It should be noted that the "a request for a data query with small workload" and "a request for a data query with large workload" shown in Table 3 are usually clearly divided based on the estimated workload of the request. The estimated workload size of a query request may usually be determined based on the scan data statistics when the follow three items are being executed: input partition number (InputPartitionNum), input bytes (InputBytes) and row number (RowNumber). Moreover, the embodiments of the present application do not limit the implementation of the determination process. In addition, for the materialized column, the information processing layer 701 will also make a simple estimate based on the Parquet footer of the physical file to achieve the purpose of optimizing the scan data statistics.

It can be seen that when there is a preset mapping relationship stored in the information processing layer 701, step 221 may specifically be: after the information processing layer 701 acquires the materialized column creation request triggered by the first user, firstly identifying the request type of the materialized column creation request by the information processing layer 701, so that in accordance with a determination that the materialized column creation request is of the first request type, querying the task execution device description information corresponding to the first request type (e.g., the "Spark engine" above, etc.) from the preset mapping relationship, and determining it as materialized column creation device description information of the first materialized column, so that the materialized column creation device description information can represent a default execution device for performing the task of creating the first materialized column, thereby enabling automatic selection of the task execution device in response to the user request, thereby contributing to improving the user experience.

Based on the relevant content of step 221 above, it can be seen that for the information processing layer 701, after acquiring the materialized column creation request triggered by the first user, the information processing layer 701 may determine the materialized column creation device description information of the first materialized column according to the materialized column creation request, so that the materialized column creation device description information can describe the task execution device for executing the task of creating the first materialized column, thereby enabling subsequent completion of the creation process for the first materialized column by means of the execution device.

At step 222, the information processing layer 701 determines the creation device to be used based on the materialized column creation device description information. The task execution layer 702 includes the creation device to be used.

Therein the creation device to be used refers to the task execution device (e.g., Spark engine as shown in FIG. 2) for executing the task of creating the first materialized column. And the creation device to be used exists in the task execution layer 702.

Additionally, the embodiments of the present application do not limit the creation device to be used. For example, if the task execution layer 702 includes multiple OLAP engines (as shown in FIG. 2), the creation device to be used may be any of the OLAP engines in the task execution layer 702.

Furthermore, the embodiments of the present application do not limit the implementation of step 222. For example, when the "materialized column creation device description information" mentioned above includes device identifier, step 222 may specifically be: directly determining the task execution device with the device identifier in the task execution layer 702 as the creation device to be used.

Based on the relevant content of step 222 above, it can be seen that for the information processing layer 701, after acquiring the materialized column creation device description information of the first materialized column, the information processing layer 701 interprets the creation device to be used from this materialized column creation device description information, so that the creation device to be used can be used to execute the task of creating the first materialized column, thereby enabling the information processing layer 701 to utilize the creation device to be used subsequently to complete the task of creating the first materialized column.

At step 223, the information processing layer 701 determines the first creation task from the materialized column creation request.

Therein the first creation task is for describing the task of creating the first materialized column in an expression manner understandable by the information processing layer 701.

Additionally, the embodiments of the present application do not limit the implementation of step 223. For example, when the "materialized column creation request" mentioned above is a materialized column creation statement, step 223 may specifically be: after the information processing layer 701 acquires the materialized column creation request triggered by the first user, the information processing layer 701 may perform a series of processing such as lexical parsing, syntax checking, and semantic analysis on the materialized column creation request to obtain the first creation task, so that the first creation task can describe the task of creating the first materialized column in an expression manner understandable by the information processing layer 701.

It should be noted that the embodiments of the present application do not limit the implementation of the processing processes such as "lexical parsing", "syntax checking", "semantic analysis" mentioned above. For example, they may be implemented according to a preset rule. In addition, for the "syntax parsing" shown in FIG. 4, this "syntax parsing" process includes the three processes of lexical parsing, syntax checking, and semantic analysis. Furthermore, the embodiments of the present application do not limit the implementation of "legitimacy verification" shown in FIG. 4.

At step 224, the information processing layer 701 translates the first creation task according to the task description language of the creation device to be used, to obtain a second creation task, wherein the second creation task is for creating the first materialized column.

Therein the task description language of the creation device to be used is for describing a task in an expression manner understandable by the creation device to be used. It can be seen that the task description language of the creation device to be used is a dialect adapted to the creation device to be used, so that this task description language can express the unique language characteristics of the creation device to be used.

The second creation task is for describing the task of creating the first materialized column in an expression manner understandable by the creation device to be used, so that the creation device to be used can assist the information processing layer 701 in completing the task of creating the first materialized column by executing the second creation task.

At step 225, the information processing layer 701 sends the second creation task to the creation device to be used, to cause the creation device to be used to execute the second creation task.

In the embodiment of the present application, after the information processing layer 701 acquires the second creation task expressed with a language characteristic specific to the creation device to be used, the information processing layer 701 may send the second creation task to the creation device to be used, so that the creation device to be used may assist the information processing layer 701 in completing the task of creating the first materialized column by executing the second creation task, so as to realize the creation process for the first materialized column.

Additionally, the embodiments of the present application do not limit the "execution of the second creation task by the creation device to be used" above. For example, it may specifically be: based on the materialized column description information of the first materialized column, the creation device to be used creates the first materialized column in the data storage space, to cause the first materialized column to be stored in the data storage space (as shown in FIG. 4).

Based on the relevant content of steps 221 to 225 above, for the information processing system 700 based on the data lake, which includes the information processing layer 701 and the task execution layer 702, the information processing layer 701 may not only be used to perform semantic parsing and other processing on the user request (e.g., the "materialized column creation request" above), but may also automatically submit the task obtained by semantic parsing to a certain task execution device in the task execution layer 702 for execution, to achieve the purpose of executing the task by any task execution device in the task execution layer 702. So that a unified set of Structured Query Language (SQL) specifications can be used to implement data queries on multiple task execution devices (e.g., multiple OLAP engines), thereby mitigating the adverse effects caused by the user demand to care about the unique language characteristics of each task execution device, which is conducive to improving the user experience.

It can be seen that for developers, expanding the task execution device (e.g., an OLAP engine) in the task execution layer 702 is convenient and low-cost, because it only needs to perform task translation and docking according to the dialect of the newly expanded task execution device, without caring about other processing processes (e.g., syntax parsing process, legality verification process, optimization process of task execution logic, etc.), and it can be easily decoupled and pluggable.

Based on the relevant content of steps 21 to 22 above, for the information processing system 700 based on the data lake, which includes the information processing layer 701, the information processing layer 701 in the information processing system 700 may provide a user interface to the first user, enabling the first user to trigger the creation process of materialized column of the information processing layer 701 by triggering a materialized column creation request on the user interface, to achieve the purpose of creating corresponding materialized columns in the data table based on the materialized column creation demand of the first user, so that these materialized columns can be used to replace some original data columns in the data table (e.g., a certain sub-column within the nested type column etc.), which can effectively avoid the adverse effects caused by the complicated access process of these original data columns, thereby helping to improve the information processing effect.

Writing Process of Materialized Columns

In fact, after creating at least one materialized column for a data table, data may be written into these materialized columns. Since a materialized column is essentially a real data column in a data table, when intending to write data into a materialized column, it may be achieved in a normal manner of writing data into a data column (e.g., the data writing manner shown in the upper right corner of FIG. 8 etc.).

However, the inventors found the following drawback of the data writing manner above in their research on the data writing manner above: every time a materialized column is added to or deleted from a data table, the data warehouse technology (Extract-Transform-Load (ETL) task of this data table needs to be modified, which is very unfriendly to the users, and means that it is difficult to be promoted subsequently.

Figure 8:
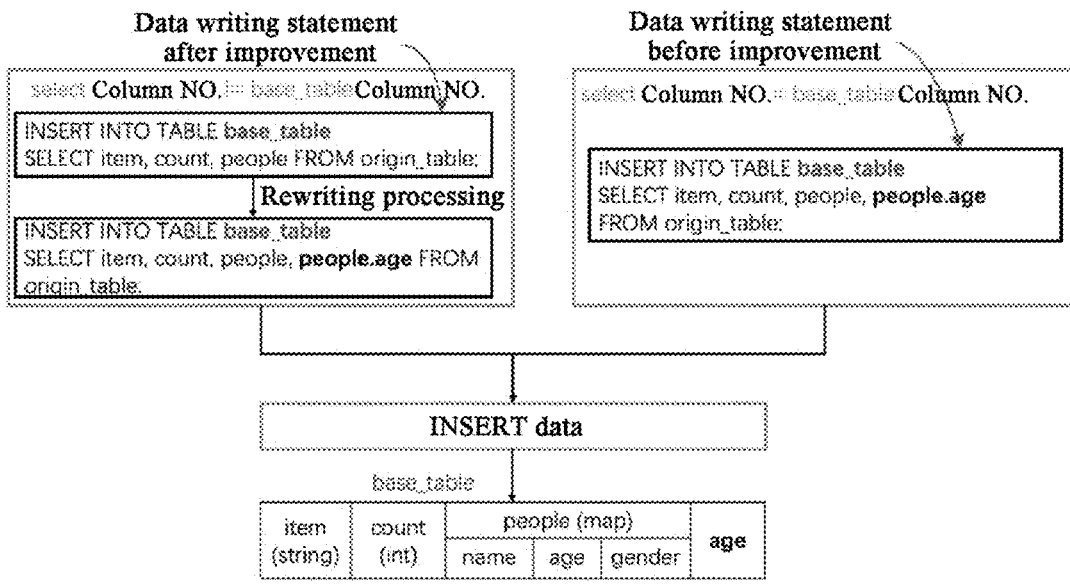
FIG. 8 is a schematic diagram of a data writing statement provided by an embodiment of the present application.

Additionally, to solve the problem above, the purpose of transparentizing online materialized columns for the ETL tasks of each data table may be achieved in a manner of rewriting for the request (e.g., the statement rewriting manner shown in the upper left corner of FIG. 8 etc.).

Figure 9:
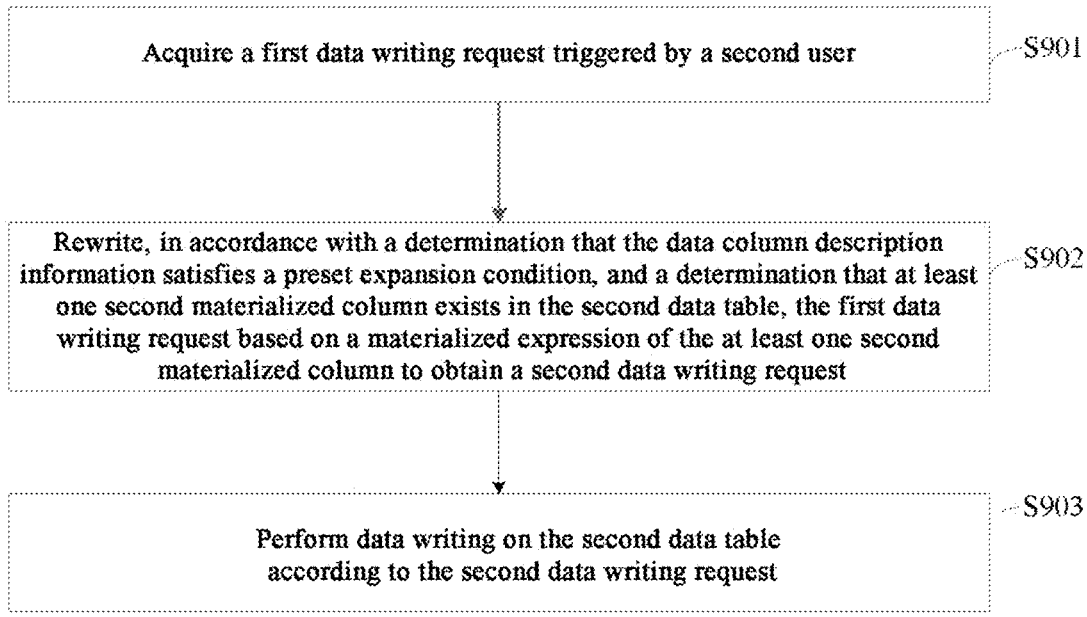
FIG. 9 is a flow chart of a method of writing data based on a data lake provided by an embodiment of the present application.
Figure 10:
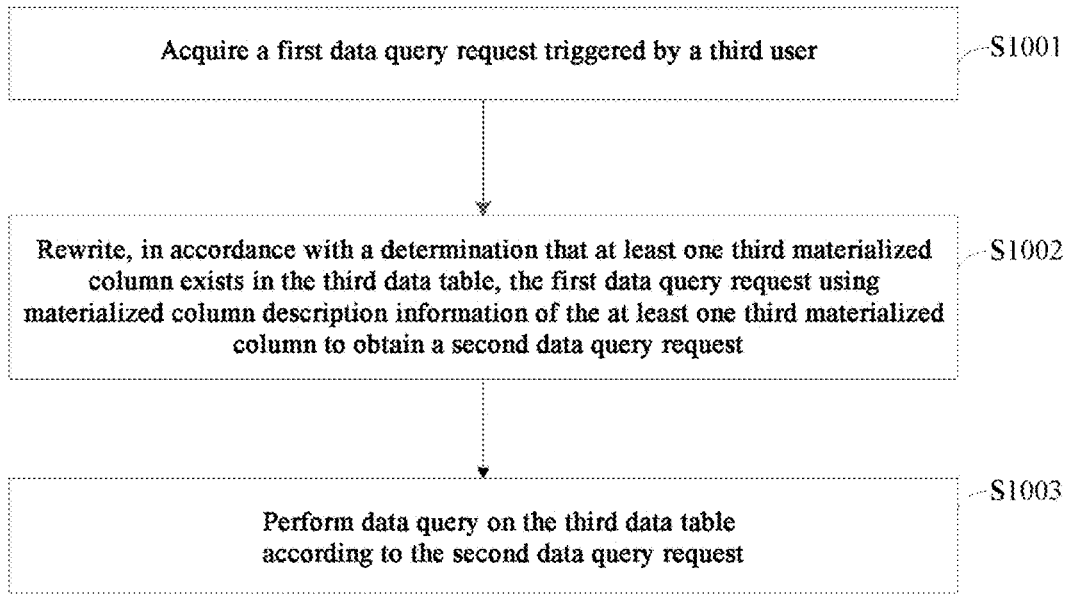
FIG. 10 is a flow chart of a method of querying data based on a data lake provided by an embodiment of the present application.

Based on this, in order to better realize writing data into the materialized column, the embodiments of the present application further provide a method of writing data based on a data lake, comprising steps S901 to S903 (as shown in FIG. 9):

At S901, a first data writing request triggered by a second user is acquired.

Therein the second user is for representing a person who has the demand to write data into a data table (especially a data table that includes a materialized column), and the embodiments of the present application do not limit the second user. In addition, the embodiments of the present application do not limit the association relationship between the second user and the first user above. For example, the two may be the same person or different persons.

The first data writing request is for requesting to write data into the second data table, and the first data writing request carries data column description information for the second data table, so that the data column description information can indicate which data the second user intends to write into each data column in the second data table.

The second data table refers to a data table that requires data writing processing. The embodiments of the present application do not limit the second data table, for example, it may be a data table including at least one materialized column and at least one common column (e.g., the data table named "base_table" as shown in FIG. 8), or it may be a data table including only common columns. In addition, the embodiments of the present application do not limit the association relationship between the second data table and the first data table above, for example, the two may be the same data table or different data tables.

The "data column description information" mentioned above is for describing information related to at least one data column in the second data table, and the embodiments of the present application do not limit this data column description information. For example, it may include: the table name of the data table which includes at least one data column in the second data table (e.g., "base_table" as shown in FIG. 8), and the data source of the written data for these data columns (e.g., "origin_table" as shown in FIG. 8 etc.).

Additionally, the embodiments of the present application do not limit the first data writing request. For example, it may be a data writing statement, so that this data writing statement can express the user demand to write data into at least one data column in the second data table.

Furthermore, the embodiments of the present application do not limit the "data writing statement" above. For example, it may be implemented using traditional statements for data writing expressions for data columns (e.g., the data writing statement shown in the upper right corner of FIG. 8 etc.). For another example, in order to further avoid adverse effects caused by users being unclear about which materialized columns exist in the second data table, the "data writing statement" above may be implemented using a statement specifically designed for data writing of the materialized column (e.g., the data writing statement shown in the upper left corner of FIG. 8, etc.), so that the data table can be provided to users transparently.

It should be noted that for the English strings shown in FIG. 8, the interpretation of "INSERT INTO TABLE base_table" is to write data into the data table named base_table. The Chinese interpretation of "SELECT item, count, people, people.age FROM origin_table" is to select the data whose data column name includes item, count, and people, as well as the data whose sub-column name is age and data column name is people, from the data table named origin_table. The Chinese interpretation of "SELECT item, count, people, FROM origin_table" is to select the data whose data column name includes item, count, and people, from the data table named origin_table. The Chinese interpretation of "select Column NO.!=base_table Column NO." is that the number of data columns carried in the data writing statement is not equal to the actual number of data columns in the data table named base_table. The Chinese interpretation of "select Column NO.=base_table Column NO." is that the number of data columns carried in the data writing statement is equal to the actual number of data columns in the data table named base_table. The Chinese interpretation of "insert" is to write.

Additionally, the embodiments of the present application do not limit the triggering manner of the first data writing request. For example, it may be implemented using any existing or future appearing request triggering manner. For another example, when the first data writing request is a data writing statement, the second user may trigger the first data writing request by inputting the data writing statement on the corresponding user interface. Therein the user interface corresponding to the second user refers to an interface that allows the second user to input data writing statements.

Figure 7:
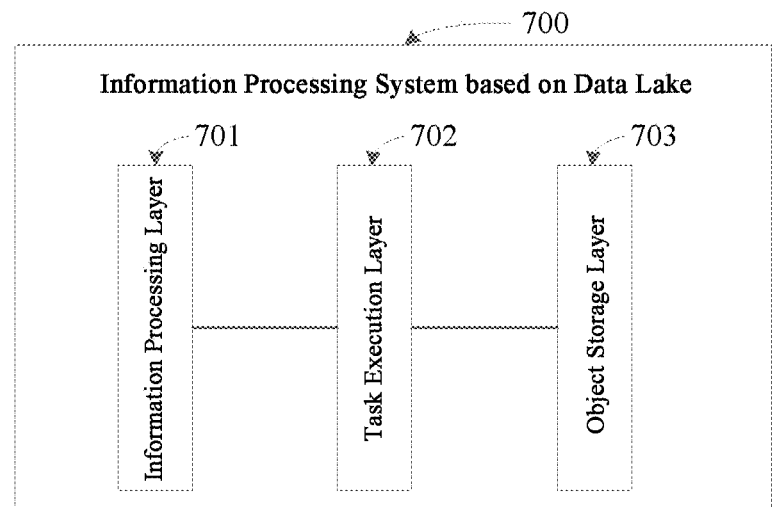
FIG. 7 is an example diagram of an information processing system based on a data lake provided by an embodiment of the present application.

Furthermore, the embodiments of the present application do not limit the manner of acquiring the first data writing request. For example, when the execution subject of the first data writing request provided by the embodiments of the present application is the information processing layer 701 in the information processing system 700 based on the data lake as shown in FIG. 7, and the information processing layer 701 includes a user interface facing the second user, the information processing layer 701 may acquire the first data writing request triggered by the second user from the user interface.

Based on the relevant content of S901 above, it can be seen that if the second user intends to write data into a data table (especially, a data table in which a materialized column exists), the second user may trigger the first data writing request on the corresponding user interface, so that the first data writing request can express the user demand to write data into at least one data column in the second data table. In this way, the execution subject of the method of writing the materialized column provided by the embodiments of the present application (e.g., the information processing layer 701 as shown in FIG. 7, etc.) can interpret the user demand from the first data writing request.

At S902, in accordance with a determination that the data column description information carried by the first data writing request satisfies a preset expansion condition, and a determination that at least one second materialized column exists in the second data table, the first data writing request is rewritten based on a materialized expression of the at least one second materialized column to obtain a second data writing request.

Therein the preset expansion condition is for representing a condition satisfied by the data writing request that requires automatic expansion processing of the data column information, and the embodiments of the present application do not limit the preset expansion condition. For example, it may specifically be: the number of data columns involved in the data column description information (that is, the number of data columns involved in the first data writing request) is less than the actual number of data columns in the second data table. In order to facilitate understanding, the following is explained in conjunction with examples.

As an example, when the first data writing request is the data writing statement "INSERT INTO TABLE base_table SELECT item, count, people, FROM origin_table" as shown in FIG. 8, and the second data table is the data table named base_table as shown in FIG. 8, the data columns involved in the first data writing request are the data column named item, the data column named count, and the data column named people, making the number of data columns involved in the first data writing request 3. However, the data table named base_table includes the data column named item, the data column named count, the data column named people, and the data column named age, making the actual number of data columns in the data table 4. It can be seen that 4≠3, so that the number of data columns involved in the first data writing request is not equal to the actual number of data columns in the data table, so that the data column description information carried by the first data writing request satisfies the preset expansion condition. In this way, the data column information expansion processing can be carried out subsequently for the first data writing request.

The "second materialized column" above is for representing a materialized column that exists in the second data table (especially, a materialized column that exists in the second data table but is not involved in the first data writing request). The creation process of the second materialized column is similar to the creation process of the first materialized column above (that is, any implementation of the "method of creating the materialized column based on the data lake" shown above), and for the sake of simplicity, it will not be described again here.

Additionally, the "materialized expression of the second materialized column" above is also similar to the "materialized expression of the first materialized column" above, and for the sake of simplicity, it will not be described again here.

The "second data writing request" above refers to the rewriting result for the first data writing request, making the number of data columns involved in the second data writing request equal to the actual number of data columns in the second data table, so that the second data writing request is able to better represent the user demand to write data into all data columns in the second data table. In order to facilitate understanding, the following is explained in conjunction with examples.

As an example, when the first data writing request is the data writing statement "INSERT INTO TABLE base_table SELECT item, count, people, FROM origin_table" shown in FIG. 8, and the second data table is the data table named base_table shown in FIG. 8, because the number of data columns involved in the first data writing request is not equal to the actual number of data columns in the data table, rewriting may be performed for the first data writing request to obtain a second data writing request (e.g., the rewritten data writing statement "INSERT INTO TABLE base_table SELECT item, count, people, people.age FROM origin_table" shown in the upper left corner of FIG. 8), so that the number of data columns involved in the second data writing request is 4, so that the number of data columns involved in the second data writing request is equal to the actual number of data columns in the data table, which allows the second data writing request to better represent the user demand for writing data into all data columns in the second data table.

The "second data writing request" above may be obtained by rewriting the materialized expression of at least one second materialized column in the second data table, so that the second data writing request includes the materialized expressions of these second materialized columns, thus allowing the second data writing request to carry information related to all data columns in the second data table.

In fact, in some scenarios, the second user may not be aware of the existence of the materialized column in the second data table. Therefore, in order to avoid the adverse effects caused by this situation, the embodiments of the present application further provide a possible implementation of determining the second data writing request, which may specifically be: according to the position order of at least one second materialized column of the second data table in the second data table, the materialized expression of the at least one second materialized column is sequentially written into the first data writing request, to obtain the second data writing request. In order to facilitate understanding, the following is explained in conjunction with examples.

It is assumed that the first data writing request is the data writing statement "INSERT INTO TABLE base_table SELECT item, count, people, FROM origin_table" shown in FIG. 8, and the second data table is the data table named base_table shown in FIG. 8.

As an example, based on the assumption above, it can be seen that because the number of data columns involved in the first data writing request is not equal to the actual number of data columns in the data table, the data column description information carried in the first data writing request satisfies the preset extension condition, so that in accordance with a determination that the second data table includes a materialized column named age, it may be inferred that the first data writing request does not involve information related to the materialized column. Therefore, in order to better write data into the second data table, the expression of the materialized column may be automatically added into the first data writing request, to obtain the second data writing request (that is, the data writing statement "INSERT INTO TABLE base_table SELECT item, count, people, people.age FROM origin_table" shown in FIG. 8), so that the second data writing request carries information related to the materialized column, so that the purpose of performing data writing on each data column (that is, each common column and each materialized column) in the second data table can be subsequently realized based on the second data writing request, which can effectively avoid the failure of the data writing operation for the second data table due to the second user not knowing that the materialized column exists in the second data table, thereby conducive to improving the user experience.

Based on the relevant content of the example above, it can be seen that in accordance with a determination that the data column description information carried in the first data writing request satisfies the preset extension condition, and a determination that at least one second materialized column exists in the second data table, it may be determined that the first data writing request most likely does not involve the second materialized columns in the second data table, so the materialized expressions of these second materialized columns may be sequentially written into the first data writing request according to the order in which the second materialized columns are arranged in the second data table, to obtain the second data writing request, so that the second data writing request can not only carry information related to the second materialized columns, but can also order the information related to the second materialized columns according to the order in which the second materialized columns are arranged in the second data table, so that the information related to the second materialized columns carried by the second data writing request can maintain a one-to-one correspondence with the second materialized columns in the second data table, thereby ensuring the accuracy of data writing.

Based on the relevant content of S902 above, it can be seen that after acquiring the first data writing request, it is determined whether the data column description information carried by the first data writing request satisfies the preset extension condition, and if so, it is determined whether there is a second materialized column in the second data table, so that in accordance with a determination that at least one second materialized column exists in the second data table, the first data writing request is rewritten based on the materialized expressions of these second materialized columns to obtain a second data writing request, so that the second data writing request carries the materialized expressions of these second materialized columns. In this way, the second data writing request carries information related to these second materialized columns, and thus the second data writing request carries information related to all data columns in the second data table. Therefore, the purpose of automatically filling data writing requests that lack information related to materialized columns can be achieved, which can effectively solve the problem that the second user cannot perform data writing for the second data because the second user does not know the relevant information of the materialized column in the second data table, which is conducive to improving the user experience.

At S903, data writing is performed on the second data table according to the second data writing request.

In the embodiments of the present application, after acquiring the second data writing request, data may be written into the second data table according to the second data writing request (especially, data is written into each data column in the second data table), realizing the data writing process for the second data table.

Based on the relevant content of S901 to S903 above, for the method of writing data based on the data lake provided in the embodiments of the present application, after acquiring the first data writing request triggered by the second user, if it is determined that the data column description information carried by this first data writing request satisfies the preset expansion condition, and it is determined that at least one second materialized column exists in the second data table, rewriting is performed first on the first data writing request, based on the materialized expressions of these second materialized columns, to obtain the second data writing request, enabling this second data writing request to carry the materialized expressions of these second materialized columns, which achieves the automatic rewriting process for the first data writing request; and then, according to this second data writing request, data writing is performed for the second data table to satisfy the user demand on data writing for the second data table. It can be seen that the materialized column writing method provided by the embodiment of the present application can automatically rewrite the data writing requests that lack materialized column information, so that the rewritten data writing request can carry these materialized column information, and thus on the premise that the second user does not know that the materialized column exists in the second data table, the second user can also use the known common columns in the second data table to perform data writing on all data columns in the second data table, thereby enhancing user experience.

Based on the rationale for "another possible implementation of the method of creating the materialized column based on the data lake" shown above, the embodiments of the present application further provide another possible implementation of the method of writing data based on the data lake, in which the method of writing data can be executed by means of the information processing system 700 based on the data lake as shown in FIG. 7, and the execution process may specifically include steps 31 to 33.

At step 31, the information processing layer 701 acquires the first data writing request triggered by the second user.

It should be noted that for the relevant content of step 31, please refer to S901 above.

Based on the relevant content of step 31, it can be seen that if the second user intends to write data into a data table (especially, a data table in which a materialized column exists), the second user may trigger the first data writing request on the user interface provided to him/her by the information processing layer 701, so that the first data writing request can express the user demand of writing data to at least one data column in the second data table, so that the information processing layer 701 can interpret the user demand from the first data writing request.

At step 32, when the information processing layer 701 determines that the data column description information carried by the first data writing request satisfies the preset expansion condition, and that there is at least one second materialized column in the second data table, the information processing layer 701 rewrites the first data writing request based on the materialized expression of the at least one second materialized column, to obtain the second data writing request.

It should be noted that for the relevant content of step 32, please refer to S902 above.

Based on the relevant content of step 32 above, it can be seen that after the information processing layer 701 acquires the first data writing request, the information processing layer 701 determines whether the data column description information carried by the first data writing request satisfies the predetermined extension condition, and if it does, the information processing layer 701 proceeds to determine whether a second materialized column exists in the second data table. So that when it is determined that at least one second materialized column exists in the second data table, the information processing layer 701 rewrites the first data writing request to obtain a second data writing request based on the materialized expressions of these second materialized columns. In this way, the second data writing request carries the materialized expressions of the second materialized columns, thereby causing the second data writing request to carry information related to these second materialized columns, and thereby causing the second data writing request to carry information related to all data columns in the second data table. So that the purpose of automatically filling the data writing request that lacks the information related to the materialized columns can be realized, thereby effectively solving the problem that the second user is unable to perform data writing on the second data because the second user is not clear about the information related to the materialized columns in the second data table, which is conducive to improving the user experience.

At step 33, the information processing layer 701 performs data writing on the second data table according to the second data writing request.

It should be noted that for the relevant content of step 33, please refer to S903 above.

In fact, the information processing layer 701 may implement the data writing process for the second data table by means of the task execution layer 702, which includes multiple task execution devices. Based on this, the embodiments of the present application further provide a possible implementation of the data writing process for the second data table, which may specifically include steps 331 to 335.

At step 331, the information processing layer 701 acquires data writing device description information.

Therein the data writing device description information is for describing the task execution device (e.g., a certain OLAP engine in the task execution layer 702 etc.) capable of performing data writing for the second data table.

In addition, the relevant content of the data writing device description information is similar to the relevant content of the "materialized column creation device description information" shown in step 221 above. Therefore, for the sake of simplicity, it will not be described again here.

Based on the relevant content of step 331 above, for the information processing layer 701, after the information processing layer 701 acquires the first data writing request triggered by the second user, the information processing layer 701 may determine the data writing device description information of the second data table based on this first data writing request, which allows the data writing device description information to describe the task execution device for performing the task of data writing for the second data table, so that the data writing process for the second data table can be completed subsequently by means of the execution device.

At step 332, the information processing layer 701 determines the writing device to be used based on the data writing device description information. Therein the task execution layer 702 includes the writing device to be used.

Therein the writing device to be used refers to the task execution device (e.g., the Spark engine shown in FIG. 2) for performing the task of data writing for the second data table. This writing device to be used exists in the task execution layer 702.

In addition, the embodiments of the present application do not limit the writing device to be used. For example, if the task execution layer 702 includes multiple OLAP engines (as shown in FIG. 2), the writing device to be used may be any of the OLAP engines in the task execution layer 702.

Furthermore, the embodiments of the present application do not limit the implementation of step 332. For example, when the "data writing device description information" mentioned above includes a device identifier, step 332 may specifically be: determining the task execution device with the device identifier in the task execution layer 702 directly as the writing device to be used.

Based on the relevant content of step 332 above, it can be seen that for the information processing layer 701, after the information processing layer 701 acquires the data writing device description information of the second data table, the information processing layer 701 interprets the writing device to be used from this data writing device description information, so that this writing device to be used is for performing the task of data writing for the second data table, which enables the information processing layer 701 subsequently to use this writing device to be used to complete the task of data writing for the second data table.

At step 333, the information processing layer 701 determines a first writing task from the second data writing request.

Therein the first writing task is for describing the task of data writing for the second data table in an expression manner understandable by the information processing layer 701.

Furthermore, the embodiments of the present application do not limit the implementation of step 333. For example, when the "second data writing request" mentioned above is a data writing statement, step 333 may specifically be: after the information processing layer 701 acquires the second data writing request triggered by the second user, the information processing layer 701 may perform a series of processing such as lexical parsing, syntax checking, and semantic analysis for the second data writing request to obtain the first writing task, so that the first writing task can describe the task of performing data writing for the second data table in an expression manner understandable by the information processing layer 701.

At step 334, the information processing layer 701 translates the first writing task according to a task description language of the writing device to be used, to obtain a second writing task, wherein the second writing task is for implementing data writing on the second data table.

Therein the task description language of the writing device to be used is for describing a task in an expression manner understandable by this writing device to be used. It can be seen that the task description language of the writing device to be used is a dialect adapted to this writing device to be used, so that this task description language can express the unique language characteristics of this writing device to be used.

The second writing task is for describing the task of performing data writing for the second data table in an expression manner understandable by the writing device to be used, so that the writing device to be used can assist the information processing layer 701 in completing the task of performing data writing on the second data table by executing this second writing task.

At step 335, the information processing layer 701 sends the second writing task to the writing device to be used, so that the writing device to be used executes the second writing task.

In the embodiments of the present application, after the information processing layer 701 acquires the second writing task expressed in the language characteristics specific to the writing device to be used, the information processing layer 701 may send this second writing task to the writing device to be used, so that the writing device to be used can assist the information processing layer 701 in completing the task of performing data writing on the second data table by executing this second writing task, thereby implementing the data writing process for the second data table.

Based on the relevant content of steps 31 to 33 above, for the information processing system 700 based on the data lake, which includes the information processing layer 701, the information processing layer 701 in the information processing system 700 may provide a user interface to the second user to enable the second user to trigger a data writing process of the information processing layer 701 by triggering the first data writing request on the user interface, to realize the purpose of writing data to some materialized columns in the data table based on the data writing demand of the second user, so that these materialized columns can store data information, so that these materialized columns can subsequently replace some of the original data columns in the data table (e.g., a certain sub-column within a nested type column, etc.) in data provision, which can effectively avoid the adverse effects caused by the complicated access process of these original data columns, thereby helping to improve the information processing effect.

Query Process of Materialized Column

In fact, in order to further improve the information processing effect, not only can the data writing process of the materialized columns be set to be transparent to the user, but also the data querying process of the materialized columns can be set to be transparent to the user, so that the user only needs to use the relevant contents of the common columns known to the user when querying for a certain data table, and does not need to take into account relevant contents of the materialized columns unknown to the user.

In order to achieve the demand above, the embodiments of the present application further provide a method of querying data based on the data lake, which includes S1001-S1003.

At S1001, a first data query request triggered by a third user is acquired.

Therein the third user is for representing a person who has a demand for data query on a data table (especially, a data table including a materialized column); and the embodiments of the present application do not limit the third user.

In addition, the embodiments of the present application also do not limit the association relationship between the third user and the first user (or, the second user) mentioned above. For example, they may be the same person, or they may be different persons.

The first data query request is for requesting data query on the third data table (i.e., querying some data from the third data table). And this first data query request carries the data query object description information for the third data table, so that the data query object description information can express which data columns in the third data table the third user intends to query data from.

The third data table refers to the data table that needs to undergo data querying processing, and the embodiments of the present application do not limit the third data table. For example, it may be a data table including at least one materialized column and at least one common column, or it may be a data table including only common columns. In addition, the embodiments of the present application do not limit the association relationship between the third data table and the first data table (or, the second data table) mentioned above. For example, they may be the same data table, or they may be different data tables.

The "data query object description information" above is for describing information related to at least one data (especially, at least one data column) in the third data table, and the embodiments of the present application do not limit the data query object description information. For example, it may include: the column name of at least one data column in the third data table (e.g., the column name "people.age" etc.).

In addition, the embodiments of the present application do not limit the first data query request. For example, it may be a data query statement, so that this data query statement can express the user demand to query some data from the third data table. It should be noted that the embodiments of the present application do not limit the "data query statement" mentioned above. For example, it may be implemented using traditional statements used to express querying some data from a data table (e.g., a statement like "SELECT people.age FROM base_table").

Furthermore, the embodiments of the present application do not limit the manner of triggering the first data query request. For example, it may use any of the existing or future triggering manners for implementation. For another example, when the first data query request is a data query statement, the third user may trigger the first data query request by inputting this data query statement on the user interface corresponding to the third user. Therein the user interface corresponding to the third user refers to the interface that allows the third user to input data query statements.

Moreover, the embodiments of the present application do not limit the manner of acquiring the first data query request. For example, when the execution subject of the first data query request provided by the embodiments of the present application is the information processing layer 701 in the information processing system 700 based on the data lake shown in FIG. 7, and the information processing layer 701 includes a user interface facing the third user, the information processing layer 701 may acquire the first data query request triggered by the third user from this user interface.

Based on the relevant content of S1001 above, if the third user intends to query some data from a data table (especially, a data table in which a materialized column exists), the third user may trigger the first data query request on the user interface thereof, so that this first data query request can express the user demand for querying some data from the second data table, so that an execution subject (e.g., the information processing layer 701 shown in FIG. 7, etc.) of the method of querying data based on the data lake provided in the embodiments of the present application can interpret the user demand from the first data query request.

At S1002, when at least one third materialized column exists in the third data table, rewriting processing is performed on the first data query request using the materialized column description information of the at least one third materialized column, to obtain a second data query request.

Therein the third materialized column is for representing the materialized column that exists in the third data table. And the creation process of the third materialized column is similar to the creation process of the first materialized column above (i.e., any implementation of the "method of creating the materialized column based on the data lake" above), and for the sake of simplicity, it will not be described again here.

The "materialized column description information of the third materialized column" above is for describing the third materialized column. And this "materialized column description information of the third materialized column" is similar to the "materialized column description information of the first materialized column" above, and for the sake of simplicity, it will not be described again here.

As an example, when at least one third materialized column exists in the third data table, the determination process of the second data query request includes steps 41 to 43.

At step 41, all the materialized columns and the corresponding materialized expressions are extracted from the third data table, to obtain at least one third materialized column and the corresponding materialized expression.

In the embodiments of the present application, after acquiring the first data query request, it may be determined, based on the table name (e.g., base_table) of the data table carried by the first data query request, that the third data table (e.g., the data table shown in Table 4 below) is the data table that needs to be used in the data query by the third user, so that in accordance with a determination that at least one third materialized column exists in the third data table, in order to better use the third data table, each third materialized column and the materialization expression corresponding to each materialized column may be directly extracted from the third data table, so that it may be possible to subsequently determine, by means of the materialization expression corresponding to each materialized column, whether or not such materialization expressions exist in the first data query request.

TABLE 4

| Creation process for each data column in a data table | |
|---|---|
| Creation process of data columns in data table | Trigger statement corresponding to the creation process |
| Creating a data table named base_table (first-level partition of date) | CREATE TABLE base_table (    a INT,    people MAP<STRING, STRING>,    location STRUCT<x: INT, y: INT>,    score ARRAY<INT>,    date STRING ) USING PARQUET PARTITIONED BY (date) |
| Adding some materialized columns to the data table named base_table on Oct. 1, 2018 | ALTER TABLE base_table ADD COLUMNS(    age STRING MATERIALIZED people.age,    name STRING MATERIALIZED people.name,    gender STRING MATERIALIZED people.gender,    x STRING MATERIALIZED location.x,    score_0 STRING MATERIALIZED score[0],    a_1_count STRING MATERIALIZED a + 1,    a_a_1_count STRING MATERIALIZED a + a + 1 ) |
| Adding other materialized columns to the data table named base_table on Nov. 1, 2018 | ALTER TABLE base_table ADD COLUMNS(    y STRING MATERIALIZED location.y ) |

The "second data query request" above refers to the rewritten result of the first data query request, enabling the second data query request to express which data columns (e.g., which materialized columns and/or which common columns) in the third data table need to be queried. Additionally, the embodiments of the present application do not limit the second data query request. For example, the second data query request may carry the column name of at least one materialized column.

Furthermore, the embodiments of the present application do not limit the implementation of "rewriting the first data query request using the materialized column description information of the at least one third materialized column to obtain a second data query request". In order to facilitate understanding, the following is explained in conjunction with examples.

At step 42, the materialized expression corresponding to each third materialized column is matched with the data query object description information carried by the first data query request, to obtain a matching result.

Therein the matching result is for indicating whether the materialized expression involved in the third data table appears in the first data query request.

In addition, the embodiments of the present application do not limit the matching result. For example, when the first data query request is a data query statement as shown in Table 5 below, and the third data table is the data table as shown in Table 4, the third data table may include the "key-value pairs of materialized expressions and materialized columns" shown in Table 4, so that the matching result may be the matching result shown in Table 5, so that the matching result may express which materialized expressions of the materialized columns in the third data table successfully match the request expression content involved in the first data query request, so that subsequent rewriting of the first data query request may be implemented based on the matching result.

It should be noted that for Table 5 below, "people.age \\ age" in Table 5 is for indicating that the content of "people.age" in the data query statement successfully matches the materialized expression of the materialized column named age in the data table shown in Table 4, and for the interpretation of other matching results, please refer to the interpretation of the matching results of "people.age \\ age" above.

TABLE 5

Data query statements and matching results

| Data query statements | Key-value pairs of materialized expressions and materialized columns | Matching results |
| --- | --- | --- |
| SELECT people.age, people.name, location.x, location.y, score[0], score[1], a + a + 1 FROM base_table WHERE date BETWEEN '20181001' AND '20181201'; | (materialized expression → materialized column) people.age →age people.name →name people.gender →gender location.x →x location.y→y score[0] →score_0 a + 1 →a_1_count a + a + 1→a_a_1_count | (request expression content \\ materialized column) people.age \\ age people.name \\ name location.x \\ x location.y \\ y score[0] \\ score_0 a + a + 1 \\ a_a_1_count |

Additionally, for the step 42 above, in order to ensure that the matching result is as optimal as possible, the principle of longest expression matching may be used for matching. For example, for the matching process shown in Table 5, although the materialized expression a+1 of the materialized column named a_1_count can successfully match the content of "a+1" in the data query statement, and the materialized expression a+a+1 of the materialized column named a_a_1_count can successfully match the content of "a+a+1" in the data query statement, when matching according to the principle of longest expression matching, the former is usually discarded and the latter is used.

At step 43, if the matching result indicates that a materialized expression of at least one materialized column to be used exists in the at least one third materialized column that matches at least content to be used in the data query object descriptive information carried by the first data query request, the first data query request is rewritten using the materialized column identifier of the at least one materialized column to be used, to obtain the second data query request.

Therein the materialized column to be used refers to the materialized column that exists in the third data table and successfully matches at least one statement content in the first data query request, so that the materialized column to be used is for indicating which materialized columns in the third data table have materialized expressions appearing in the first data query request.

The "content to be used" above is for representing a content existing in the first data query request that successfully matches a materialized expression of a materialized column to be used (e.g., people.age, etc.).

Furthermore, the embodiments of the present application do not limit he implementation of the above step "rewriting the first data query request using the materialized column identifier of the at least one materialized column to be used, to obtain the second data query request". For example, it may specifically be: using the materialized identifier of the first materialized column to be used to replace all the contents to be used in the first data query request that matches the materialized expression of the first materialized column to be used; using the materialized identifier of the second materialized column to be used to replace all the contents to be used in the first data query request that matches the materialized expression of the second materialized column to be used; . . . (and so on); and using the materialized identifier of the Nth materialized column to be used to replace all the contents to be used in the first data query request that matches the materialized expression of the Nth materialized column to be used, to obtain the second data query request, so that the second data query request no longer carries materialized expressions of the materialized columns to be used, but carries the materialized column identifiers of the materialized columns to be used, where N represents the number of materialized columns to be used.

Based on the relevant content of steps 41 to 43 above, it can be seen that after acquiring the first data query request for requesting a data query on the third data table, the materialized column identifiers of at least one of the third materialized columns in the third data table may be used to replace the materialized column expressions of these third materialized columns appearing in the first data query request, to obtain the second data query request, so that any materialized column expression involved in the third data table no longer exists in the second data query request, so that the purpose of using some materialized columns in the third materialized column to replace some common columns in providing data can be achieved.

In fact, when some materialized columns in the third data table are used to directly replace common columns in providing data, the following phenomena may occur: when the first data query request is the data query statement shown in Table 5 above, and the third data table is the data table shown in Table 4 above, if the content "score[0]" in the first data query request is replaced with score_0, the contents of "score_0" and "score[1]" will both appear in the replaced first data query request. Although the accuracy of the execution results can be guaranteed, during execution, the data of the materialized column named score_0 and the common column named score in the third data table need to be read into the memory. In this case, the common column named score contains the data of score[0] and score[1], so after reading the common column named score into the memory, it is equivalent to reading the data recorded in score[0] one more time because the data recorded in the materialized column named score_0 already exists in the memory, which is prone to deteriorate the performance of the query.

In order to overcome the above phenomena, the embodiments of the present application further provide another possible implementation of the process of determining the second data query request, which may specifically include steps 51 to 55.

At step 51, all materialized columns and the corresponding materialized expressions are extracted from the third data table, to obtain at least one third materialized column and the corresponding materialized expression.

It should be noted that for the relevant content of step 51, please refer to step 41 above.

At step 52, the materialized expression corresponding to each third materialized column is matched with the data query object description information carried in the first data query request, to obtain matching results.

It should be noted that for the relevant content of step 52, please refer to step 42 above.

At step 53, at least one materialized column to be used is determined based on the matching results.

In the embodiments of the present application, after obtaining the matching results, if the matching result indicates that, in the at least one third materialized column, there is at least one materialized column to be used whose the materialized expression matches at least one content to be used in the data query object description information carried in the first data query request, these materialized columns to be used may be acquired so that these materialized columns to be used can indicate which materialized columns in the third data table may participate in the rewriting process for the first data query request.

At step 54, in accordance with a determination that a preset association condition between an associated materialized column of the materialized column to be eliminated in the at least one materialized column to be used and a data column to be queried in the data query object description information carried by the first data query request is satisfied, and that none of the associated materialized columns of the respective materialized columns to be used is the data column to be queried, the materialized column to be eliminated is deleted from the at least one materialized column to be used, to obtain at least one alternative materialized column.

Therein the materialized column to be eliminated refers to the materialized column to be used that needs to be deleted. And a preset association condition between the associated materialized column of the materialized column to be eliminated and the data column to be queried in the data query object description information is satisfied. In addition, the embodiments of the present application do not limit the number of materialized columns to be eliminated.

The associated materialized column of the materialized column to be eliminated is a data column in the third data table that is within the materialized expression of the materialized column to be eliminated. It can be seen that for the materialized column to be eliminated, the associated materialized column of the materialized column to be eliminated is also a data column in the third data table, and the associated materialized column appears in the materialized expression of the materialized column to be eliminated. For example, if the materialized column to be eliminated is the materialized column named age shown in FIG. 8, the associated materialized column of the materialized column to be eliminated is the sub-column named age within the common column named people shown in FIG. 8.

The preset association condition may be set in advance. For example, it may be specifically: both are sub-columns under the same data column. For example, for the two sub-columns score[0] and score[1] included in the common column named score, these two sub-columns are sub-columns under the common column named score, which enables the preset association condition to be met between the two sub-columns.

The data column to be queried refers to the data column involved in the first data query request that meets the preset association condition with the materialized column associated with the materialized column to be eliminated, and that has no association relationship with each materialized column to be used. In order to facilitate understanding, the following is explained in conjunction with examples.

As an example, when the first data query request is the data query statement shown in Table 5 above, at least one materialized column to be used includes each materialized column involved in the "matching results" shown in Table 5 above, and each third materialized column and its corresponding materialized expression in the third data table are the "key-value pair of materialized expression and materialized column" shown in Table 5 above, because the materialized expression of the materialized column named score_0 involves the sub-column score[0] in the common column named score, the sub-column score[0] is the associated materialized column of the materialized column named score_0, and because the two sub-columns score[0] and score[1] are both sub-columns under the common column named score, the preset association condition is satisfied between the two sub-columns score[0] and score [1], further because the associated materialized columns of respective materialized columns to be used are not the sub-column of score[1], there is no materialized column among these materialized columns to be used that can replace the sub-column of score[1] in providing data. It can be seen that when the materialized column to be eliminated is a materialized column named score_0, the data column to be queried that satisfies the preset association condition with the materialized column to be eliminated is the sub-column score[1].

Based on the content of the paragraph above, it can be seen that if the materialized column identifier of the materialized column named score_0 is directly used to replace the materialized column expression of the materialized column named score_0 in the first data query request, it will cause the first data query request after the replacement to involve both the materialized column named score_0 and the sub-column score[1] in the common column named score, thus, in the subsequent data query process, it is not only necessary to read all the sub-columns in the common column named score from the data storage space, but also necessary to read the materialized column named score_0 from the storage space, which results in the data recorded in score[0] being read twice, which leads to the waste of resources (e.g., the waste of I/O resources, the waste of memory resources, etc.); therefore, in order to avoid such waste of resources, the materialized column named score_0 may be directly deleted from the "at least one materialized column to be used" above, so that the materialized column named score_0 does not participate in the rewriting process of the first data query request, so the undesirable effect caused by replacing the materialized column expression of the materialized column named score_0 in the first data query request with the materialized column identifier of the materialized column named score_0 can be effectively avoided.

Based on the relevant content of step 54 above, it can be seen that after acquiring the at least one materialized column to be used, a judgment may be made as to whether or not there exists a data column to be queried corresponding to each of the materialized columns to be used in all of the data columns involved in the first data query request, and a judgment result may be obtained. If the judgment result indicates that among all the data columns involved in the first data query request, there is at least one data column to be queried corresponding to the materialized column to be eliminated, these materialized columns to be eliminated may be deleted from these materialized columns to be used, to obtain at least one alternative materialized column, so that these alternative materialized columns can participate in the rewriting process for the first data query request.

At step 55, rewriting processing is performed on the first data query request using the materialized column identifier of at least one alternative materialized column, to obtain a second data query request.

In the embodiments of the present application, after acquiring at least one alternative materialized column, the first data query request may be rewritten using the materialized column identifiers of these alternative materialized columns, to obtain a second data query request, so that instead of the materialized expressions of these alternative materialized columns, the materialized column identifiers of these alternative materialized columns are present in the second data query request, which enables the purpose of using some of the materialized columns among the third materialized columns to replace some of the common columns in providing data.

It should be noted that the rewriting process involved in step 55 is similar to the rewriting process involved in step 43 above. For the sake of simplicity, it will not be described again here.

Based on the relevant content of steps 51 to 55 above, it can be seen that after acquiring the first data query request for requesting a data query on the third data table, at least one alternative materialized column may be first filtered out from all materialized columns of the third data table; and then a second data query request is obtained by replacing the materialized column expressions of these alternative materialized columns appearing in the first data query request with the materialized column identifiers of these alternative materialized columns, so that any of the materialized column expressions of these alternative materialized columns no longer exists in the second data query request, so it is possible to achieve the purpose of using some materialized columns in the third data table to replace some common columns in providing data.

In fact, the materialized column may support dynamic addition or deletion, which means that different materialized columns may exist in different partitions of the data storage space, so in order to further improve the correctness of the rewriting, it may be ensured that all of the materialized columns involved in the replacement exist in all query partitions.

Based on this, the embodiments of the present application also provide yet another possible implementation of the determination process of the second data query request, which specifically may include steps 61 to 67.

At step 61, at least one candidate materialized column set of the third data table is determined based on the storage space query scope description information carried by the first data query request.

Therein the storage space query scope description information is for describing for the partitions in the data storage space where the third data table to be queried is stored. And the embodiments of the present application do not limit the storage space query scope description information. For example, it may be the partition described by the content "WHERE date BETWEEN '20181001' AND '20181201'" shown in Table 5 above.

The "candidate materialized column set" above is for recording the materialized columns stored in a certain partition for the third data table. For example, when the third data table is the data table shown in Table 4 above, the third data table has a data column named age, a data column named name, a data column named gender, a data column named x, a data column named score_0, a data column named a_1_count, and a data column named a_a_1_count stored in the partition corresponding to Oct. 1, 2018, so that the candidate materialized column set under the partition corresponding to the third data table on Oct. 1, 2018 is {data column named age, data column named name, data column named gender, data column named x, data column named score_0, data column named a_1_count, and data column named a_a_1_count}. In the same way, it can be seen that the candidate materialized column set under the partition corresponding to the third data table on Nov. 1, 2018 is {data column named age, data column named name, data column named gender, data column named x, data column named score_0, data column named a_1_count, data column named a_a_1_count, and data column named y}.

Based on the relevant content of step 61 above, it can be seen that after acquiring the first data query request, at least one partition to be queried may be determined first based on the storage space query scope description information carried in the first data query request, so that the third data table is stored in all these partitions to be queried; then, all materialized columns may be extracted from the third data table stored in each partition to be queried, to obtain the candidate materialized column set corresponding to each partition to be queried, so that each candidate materialized column set can respectively represent the materialized columns, stored in each partition to be queried, for the third data table.

It should be noted that the "at least one third materialized column" above is obtained based on the union set of all candidate materialized column sets of the third data table, so that these third materialized columns can represent the materialized columns that have appeared in the third data table stored in the at least one query partition requested by the third user.

At step 62, at least one intersection materialized column is determined from at least one candidate materialized column set.

Therein the intersection materialized column is for representing a materialized column that has appeared in all of the third data tables stored in all of the query partitions requested by the third user.

Based on the relevant content of step 62, it can be seen that after acquiring the at least one candidate materialized column set of the third data table, the at least one intersection materialized columns may be determined based on the intersections between these candidate materialized column sets so that these intersection materialized columns can represent the intersections between these candidate materialized column sets, and thus, the intersection materialized columns can represent those materialized columns that appear in the third data table stored in all query partitions requested by the third user.

It should be noted that the embodiments of the present application do not limit the execution time of steps 61 to 62, and the execution time of steps 61 to 62 is later than the acquisition time of the "first data query request" above.

At step 63, all materialized columns and the corresponding materialized expressions are extracted from the third data table, to obtain at least one third materialized column and the corresponding materialized expression.

It should be noted that for the relevant content of step 63, please refer to step 41 above.

At step 64, the materialized expression corresponding to each third materialized column is matched with the data query object description information carried in the first data query request, to obtain matching results.

It should be noted that for the relevant content of step 64, please refer to step 42 above.

At step 65, at least one materialized column to be used is determined based on the matching results.

It should be noted that for the relevant content of step 65, please refer to step 53 above.

At step 66, at least one target materialized column is selected from at least one materialized column to be used using at least one intersection materialized column.

In the embodiments of the present application, after acquiring at least one intersection materialized column (e.g., the "materialized columns common to all query partitions" shown in Table 6 below) and at least one materialized column to be used (e.g., the "materialized columns resulting from matching" shown in Table 6 below), at least one target materialized column (e.g., the "finally used materialized columns" shown in Table 6 below) may be determined based on the intersection between these intersection materialized columns and these materialized columns to be used, so that these target materialized columns can represent those materialized columns that appear in the third data table stored in all query partitions requested by the third user, and whose materialized expressions successfully match at least one content in the first data query request.

It should be noted that for Table 6, because the materialized column named y was created on Nov. 1, 2018 (as shown in Table 4 above), the materialized column named y may only appear in the data table stored from Nov. 1, 2018. However, because the query partition requested by the third user is the partition for storing the third data table from Oct. 1, 2018 to Dec. 1, 2018, a materialized column named y exists in the partition for storing the third data table from Nov. 1, 2018 to Dec. 1, 2018, but there is no materialized column named y in the partition for storing the third data table from Oct. 1, 2018 to Oct. 31, 2018, so it is necessary to filter out the materialized column named y, so that the materialized column named y no longer exists in the intersection of the materialized columns of all query partitions for the data table.

TABLE 6

A filtering process for target materialized columns

| Materialized columns common to all query partitions | Materialized columns resulting from matching | Finally used materialized columns | Corrected matching results |
|---|---|---|---|
| age, | age | age | (Request expression content\\materialized column) |
| name, | name | name | |
| gender, | x | x | |
| x, | y | score_0 | people.age \\ age |
| score_0, | score_0 | a_a_1_count | people.name \\ name |
| a_1_count, | a_a_1_count | | location.x \\ x |
| a_a_1_count | | | score[0] \\ score_0 |
| | | | a + a + 1 \\ a_a_1_count |

In fact, in order to avoid as much as possible the adverse effects caused by using certain materialized columns in the third data table to directly replace common columns in data provision (e.g., the adverse effects overcome by means of steps 51 to 55 above), the embodiments of the present application further provides another possible implementation of step 66, which may specifically include steps 661 to 662.

At step 661, at least one materialized column to be selected is determined based on an intersection between at least one intersection materialized column and at least one materialized column to be used.

In the embodiments of the present application, after acquiring at least one intersection materialized column (e.g., the "materialized columns common to all query partitions" shown in Table 6) and at least one materialized column to be used (e.g., the "materialized columns resulting from matching" shown in Table 6), at least one materialized column to be selected may be determined based on the intersection between these intersection materialized columns and these materialized columns to be used (e.g., the "finally used materialized columns" shown in Table 6), so that these materialized columns to be selected can represent those materialized columns that appear in the third data table stored in all query partitions requested by the third user, and whose materialized expressions successfully match at least one content in the first data query request.

At step 662, in accordance with a determination that a preset association condition between the associated materialized column of the materialized column to be discarded in at least one materialized column to be selected and the data column to be compared in the data query object description information carried in the first data query request is satisfied, and the associated materialized columns of each materialized column to be selected are not the data columns to be compared, the materialized column to be discarded is deleted from the at least one materialized column to be selected, to obtain at least one target materialized column.

Therein the materialized column to be discarded refers to the materialized column to be selected that needs to be deleted, and the preset association condition between the associated materialized column of the materialized column to be discarded and the data column to be compared in the data query object description information is satisfied. In addition, the embodiments of the present application do not limit the number of materialized columns to be discarded. In addition, the relevant content of the materialized columns to be discarded is similar to the relevant content of the "materialized columns to be eliminated" above, and for the sake of simplicity, it will not be described again here.

For the relevant content of the preset association condition, please refer to the relevant content of the preset association condition shown in step 54 above.

The data column to be compared refers to the data column involved in the first data query request that satisfies the preset association condition with the materialized column associated with the materialized column to be discarded, and that has no association with each materialized column to be selected. In addition, the relevant content of the data column to be compared is similar to the relevant content of the "data column to be compared" above, and for the sake of simplicity, it will not be described again here.

In order to facilitate understanding of step 662, the following is explained in conjunction with an example.

It is assumed that the third data table is the data table shown in Table 4, the first data query request is the data query statement shown in Table 5, and the at least one materialized column to be selected includes the "finally used materialized columns" shown in Table 6.

As an example, based on the assumption above, it can be seen that because the first data query request is the data query statement shown in Table 5, the data columns involved in the first data query request are the "data columns involved in the first data query request" shown in Table 7, and because the third data table is the data table shown in Table 4, there are sub-columns named x and y in the data column named location in the third data table, and there are sub-columns for recording the values of each dimensional array in the data column named score in the third data table (e.g., two sub-columns of score[0] and score[1], etc.), further because at least one of the materialized columns to be selected includes the "finally used materialized columns" shown in Table 6, the data columns to be compared corresponding to the materialized columns named x in those materialized columns to be selected are sub-columns named y in the data columns named location involved in the first data query request, and the data columns to be compared corresponding to the materialized columns named score_0 are sub-columns represented by score[1] in the first data query request, in order to avoid as much as possible the adverse effects caused by certain materialized columns replacing common columns in providing data, the materialized columns named x and the materialized columns named score_0 may be directly deleted from these materialized columns to be selected, to obtain at least one target materialized column (e.g., the at least one target materialized column shown in Table 7), so that these target materialized columns can be subsequently used to participate in the rewriting process for the first data query request.

TABLE 7

Another filtering process for target materialized columns

| Data columns involved in the first data query request | At least one materialized column to be selected | Materialized columns to be discarded and the corresponding data columns to be compared | At least one target materialized column |
|---|---|---|---|
| people.age, people.name, location.x, location.y, score[0], score[1], a + a + 1 | age name x score_0 a_a_1_count | (Materialized column to be discarded → Data column to be compared) x→location.y score_0→score[1] | age name a_a_1_count |

Based on the relevant content of step 66 above, it can be seen that after acquiring at least one intersection materialized column and at least one materialized column to be used, at least one target materialized column may be selected from these materialized columns to be used by referring to these intersection materialized columns, so that these target materialized columns can be used in the subsequent rewriting process for the first data query request.

At step 67, the first data query request is rewritten using the materialized column identifier of at least one target materialized column, to obtain a second data query request.

It should be noted that the rewriting process involved in step 67 is similar to the rewriting process involved in step 43 above, and will not be described again for the sake of simplicity.

It can be seen that in the embodiments of the present application, after acquiring at least one target materialized column (e.g., at least one target materialized column shown in Table 7 above), the first data query request (e.g., the first data query request shown in Table 8 below) may be rewritten using the materialized column identifiers of these target materialized columns, to obtain a second data query request (e.g., the second data query request shown in Table 8 below), so that the materialized expressions of these target materialized columns do not exist in the second data query request, but the materialized column identifiers of these target materialized columns exist, and thus the purpose of using some materialized columns in the third materialized column to replace some common columns in providing data can be achieved.

these third materialized columns, to replace the materialized expressions of some third materialized columns recorded in the first data query request with the materialized column identifiers of these third materialized columns, to obtain the second data query request, so that when the second data query request is used to perform data query on the third data table, the purpose of using some materialized columns in the third data table to replace some common columns in providing data can be achieved.

At S1003, data query is performed on the third data table according to the second data query request.

In the embodiments of the present application, after acquiring the second data query request, data query may be performed on the third data table according to the second data query request, to implement the data query process on the third data table, so that the purpose of using some materialized columns in the third data table to replace some common columns in providing data can be achieved.

Based on the relevant content of S1001 to S1003 above, it can be seen that for the method of querying data based on the data lake provided by the embodiments of the present application, after acquiring the first data query request triggered by the third user, if it is determined that there is at least one third materialized column exists in the third data table involved in the first data query request, first, the first data query request is rewritten based on the materialized column description information of these third materialized columns, to replace the materialized expressions of some third materialized columns recorded in the first data query request with the materialized column identifiers of these

TABLE 8

Rewriting process for the first data query request

| First data query request | Replacement mapping | Second data query request |
|---|---|---|
| SELECT<br>  people.age,<br>  people.name,<br>  location.x,<br>  location.y,<br>  score[0],<br>  score[1],<br>  a + a + 1<br>FROM base_table<br>WHERE date BETWEEN<br>'20181001' AND '20181201'; | (Request expression<br>content→replacement result)<br>people.age→age<br>people.name→name<br>a + a + 1→a_a_1_count | SELECT<br>  age,<br>  name,<br>  location.x,<br>  location.y,<br>  score[0],<br>  score[1],<br>  a_a_1_count<br>FROM base_table<br>WHERE date BETWEEN<br>'20181001' AND '20181201'; |

Based on the relevant content of steps 61 to 67 above, it can be seen that after acquiring the first data query request for requesting data query on the third data table, the materialized column expressions of the intersection materialized columns that appear in the first data query request may be replaced with the materialized column identifier of at least one intersection materialized columns common to the third data table in all query partitions to obtain the second data query request, so that any materialized column expression of these intersection materialized columns no longer exists in the second data query request, and thus the purpose of using some materialized columns common to all query partitions in the third materialized column to replace some common columns in providing data can be achieved.

Based on the relevant content of S1002 above, it can be seen that after acquiring the first data query request for data query on the third data table, when there is at least one third materialized column in the third data table, rewriting processing may be performed on the first data query request using the materialized column description information of third materialized columns, to obtain the second data query request, so that the second data query request can involve some common columns and some materialized columns in the third data table, and then, according to the second data query request, data query is performed on the third data table to realize user demand for data query for the third data table, and thus the purpose of using some materialized columns in the third data table to replace some common columns in providing data can be achieved, which can effectively mitigate the adverse effects caused by directly using these common columns in providing data, thereby effectively improving the user's data query experience.

For the same reason as the "another possible implementation of the method of creating the materialized column based on the data lake" shown above, the embodiments of the present application further provide another possible implementation of the method of querying data based on the data lake. In this implementation, the method of querying data may be executed by means of the information processing system 700 based on the data lake shown in FIG. 7, and the execution process may specifically include steps 71 to 73.

At step 71, the information processing layer 701 acquires the first data query request triggered by the third user.

It should be noted that for the relevant content of step 71, please refer to S1001 above.

Based on the relevant content of step 71, it can be seen that if the third user intends to query some data from a data table (especially, a data table in which a materialized column exists), the third user may trigger the first data query request on the user interface provided to him/her by the information processing layer 701, so that the first data query request can express the user demand to query some data from the second data table, and thus the information processing layer 701 can interpret the user demand from the first data query request.

At step 72, when there is at least one third materialized column in the third data table, the information processing layer 701 uses the materialized column description information of the at least one third materialized column to rewrite the first data query request, to obtain a second data query request.

It should be noted that for the relevant content of step 72, please refer to the relevant content of S1002 above.

Based on the relevant content of step 72, it can be seen that after the information processing layer 701 acquires the first data query request for performing data query on the third data table, when there is at least one third materialized column in the third data table, the information processing layer 701 may use the materialized column description information of these third materialized column to rewrite the first data query request, to replace the materialized expressions of some third materialized columns recorded in the first data query request with the materialized column identifiers of these third materialized columns to obtain the second data query request, so that when the second data query request is used to perform data query on the third data table, the purpose of using some materialized columns in the third data table to replace some common columns in providing data can be achieved.

At step 73, the information processing layer 701 performs data query on the third data table according to the second data query request.

It should be noted that for the relevant content of step 73, please refer to S1003 above.

In fact, the information processing layer 701 may implement the data query process for the third data table by means of the task execution layer 702 which includes multiple task execution devices. Based on this, the embodiments of the present application further provide a possible implementation of the data query process for the third data table, which may specifically include steps 731 to 735.

At step 731, the information processing layer 701 acquires the data query device description information.

The data query device description information is for describing a task execution device (e.g., a certain OLAP engine in the task execution layer 702, etc.) that can perform the task of performing data query for the third data table.

In addition, the relevant content of the data query device description information is similar to the relevant content of the "materialized column creation device description information" shown in step 221 above. So, for the sake of simplicity, it will not be described again here.

Based on the relevant content of step 731 above, it can be seen that for the information processing layer 701, after the information processing layer 701 acquires the first data query request triggered by the third user, the information processing layer 701 may determine the data query device description information of the third data table based on the first data query request, to cause the data query device description information to describe the task execution device for performing the task of performing data query for the third data table, so that the data query process for the third data table can be completed subsequently by means of the execution device.

At step 732, the information processing layer 701 determines the query device to be used based on the data query device description information.

Therein the query device to be used refers to a task execution device for performing the task of performing data query for the third data table, and the query device to be used exists in the task execution layer 702.

In addition, the embodiments of the present application do not limit the query device to be used. For example, if the task execution layer 702 includes multiple OLAP engines (as shown in FIG. 2), the query device to be used may be any OLAP engine in the task execution layer 702.

Furthermore, the embodiments of the present application do not limit the implementation of step 732. For example, when the "data query device description information" above includes a device identifier, step 732 may specifically be: directly determining the task execution device with the device identifier in the task execution layer 702 as the query device to be used.

Based on the relevant content of step 732 above, it can be seen that for the information processing layer 701, after the information processing layer 701 acquires the data query device description information of the third data table, the information processing layer 701 interprets the query device to be used from the data query device description information, so that the query device to be used is for performing the task of performing data query for the second data table, so that the information processing layer 701 can subsequently complete the task of performing data query for the second data table, by means of the query device to be used.

At step 733, the information processing layer 701 determines the first query task from the second data query request.

Therein first query task is for describing the task of performing data query for the second data table in an expression manner understandable by the information processing layer 701.

In addition, the embodiments of the present application do not limit the implementation of step 733. For example, when the "second data query request" above is a data query statement, step 733 may specifically be: after the information processing layer 701 acquires the second data query request triggered by the second user, the information processing layer 701 may perform a series of processing such as lexical parsing, syntax checking, and semantic analysis for the second data query request, to obtain the first query task, so that the first query task can describe the task of performing data query on the third data table in an expression manner understandable by the information processing layer 701.

At step 734, the information processing layer 701 translates the first query task according to the task description language of the query device to be used, to obtain the second query task, wherein the second query task is for implementing data query on the third data table.

Therein the task description language of the query device to be used is for describing a task in an expression manner understandable by the query device to be used. It can be seen that the task description language of the query device to be used is a dialect adapted to the query device to be used, so that the task description language can express the unique language characteristics of the query device to be used.

The second query task is for describing the task of performing data query for the third data table in an expression manner understandable by the query device to be used, so that the query device to be used can assist the information processing layer 701 in completing the task of performing data query for the third data table, by executing the second query task.

At step 735, the information processing layer 701 sends the second query task to the query device to be used, so that the query device to be used executes the second query task.

In the embodiments of the present application, after the information processing layer 701 acquires the second query task expressed according to the unique language characteristics of the query device to be used, the information processing layer 701 may send the second query task to the query device to be used, so that the query device to be used can assist the information processing layer 701 in completing the task of data query on the third data table by executing the second query task, so that the data query process for the third data table can be realized.

Based on the relevant content of steps 71 to 73 above, it can be seen that for the information processing system 700 based on the data lake including the information processing layer 701, the information processing layer 701 in the information processing system 700 may provide a user interface to the third user, so that the third user can trigger the data query process of the information processing layer 701 by triggering the first data query request on the user interface, to achieve the purpose of using some materialized columns in the data table to replace some common columns in providing data based on the data query demand of the third user, which can effectively avoid the adverse effects caused by the complicated access process of these common columns, thereby helping to improve the information processing effect.

Based on the method of creating the materialized column based on the data lake provided by the method embodiments above, the embodiments of the present application further provide an apparatus of creating a materialized column based on a data lake, which will be explained and described below in conjunction with the accompanying drawings. It should be noted that, for technical details of the apparatus of creating the materialized column based on the data lake provided by the embodiments of the present application, please refer to the relevant content of the method of creating the materialized column based on the data lake above.

Figure 11:
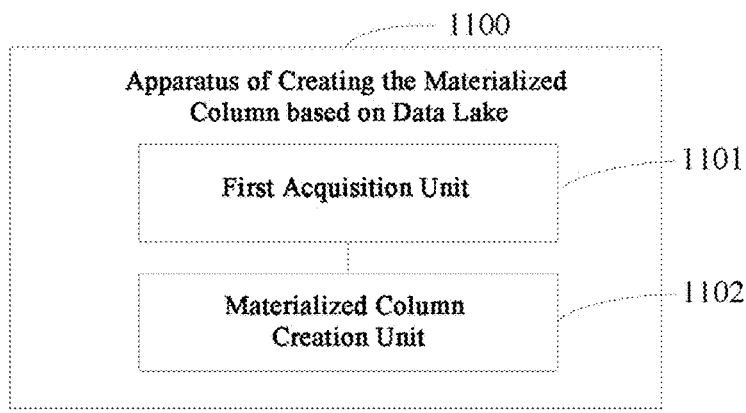
FIG. 11 is a schematic structural diagram of an apparatus of creating a materialized column based on a data lake provided by an embodiment of the present application.

Referring to FIG. 11, it can be seen that this figure is a schematic structural diagram of an apparatus of creating a materialized column based on a data lake provided by an embodiment of the present application.

The apparatus 1100 of creating the materialized column based on the data lake provided by the embodiment of the present application comprises:

a first acquisition unit 1101, configured to acquire a materialized column creation request triggered by a first user, wherein the materialized column creation request is for requesting to create a first materialized column in a first data table, the materialized column creation request carries a materialized expression of the first materialized column, and the materialized expression is for describing a data association relationship between the first materialized column and a target column in the first data table; and a materialized column creation unit 1102, configured to create the first materialized column according to the materialized column creation request, wherein the first materialized column is used to replace the target column in providing data for a data query request carrying the materialized expression.

In a possible implementation, the materialized column creation unit 1102 is specifically configured to create the first materialized column in the data storage space based on the materialized column description information carried by the materialized column creation request, to cause the first materialized column to be stored in the data storage space, wherein the materialized column description information comprises the materialized expression of the first materialized column.

In a possible implementation, the materialized column creation unit 1102 comprises: an expression storage subunit, configured to create metadata of the first materialized column in the data storage space, and store the materialized expression of the first materialized column in the metadata in a predefined description format.

In a possible implementation, the apparatus 1100 of creating the materialized column based on the data lake further comprises:

a fourth acquisition unit, configured to acquire the materialized column creation device description information; and a first determination unit, configured to determine the creation device to be used based on the materialized column creation device description information; and the materialized column creation unit 1102 is specifically configured to: determine the first creation task from the materialized column creation request, translate the first creation task according to the task description language of the creation device to be used, to obtain the second creation task, wherein the second creation task is for creating the first materialized column, and sending the second creation task to the creation device to be used, to cause the creation device to be used to execute the second creation task.

In a possible implementation, the fourth acquisition unit is specifically configured to: in accordance with a determination that the materialized column creation request belongs to the first request type, query the task execution device description information corresponding to the first request type from the preset mapping relationship, and determine the task execution device description information as the materialized column creation device description information.

In a possible implementation, the fourth acquisition unit is specifically configured to: when the materialized column creation request carries the materialized column creation device description information, extract the materialized column creation device description information from the materialized column creation request.

Based on the relevant content of the apparatus 1100 of creating the materialized column based on the data lake above, it can be seen that for the apparatus 1100 of creating the materialized column based on the data lake provided by the embodiments of the present application, after acquiring the materialized column creation request triggered by the first user, according to the materialized column creation request, the first materialized column is created in the first data table, so that the first data table includes the first materialized column, and thus the user demand of creating the first materialized column in the first data table expressed by the materialized column creation request can be realized.

Therein because there is a data association relationship between the first materialized column and the target column in the first data table, in some cases the first materialized column can replace the target column in responding to the data query request for the first data table, so that adverse effects caused by inconvenient reading of the target column can be effectively avoided, thereby effectively improving the reading efficiency of the target column, thereby improving the information processing effect.

Based on the method of writing data based on the data lake provided by the method embodiments above, the embodiments of the present application further provide an apparatus of writing data based on a data lake, which will be explained and described below in conjunction with the accompanying drawings. It should be noted that, for technical details of the apparatus of writing data based on the data lake provided by the embodiments of the present application, please refer to the relevant content of the method of writing data based on the data lake above.

Figure 12:
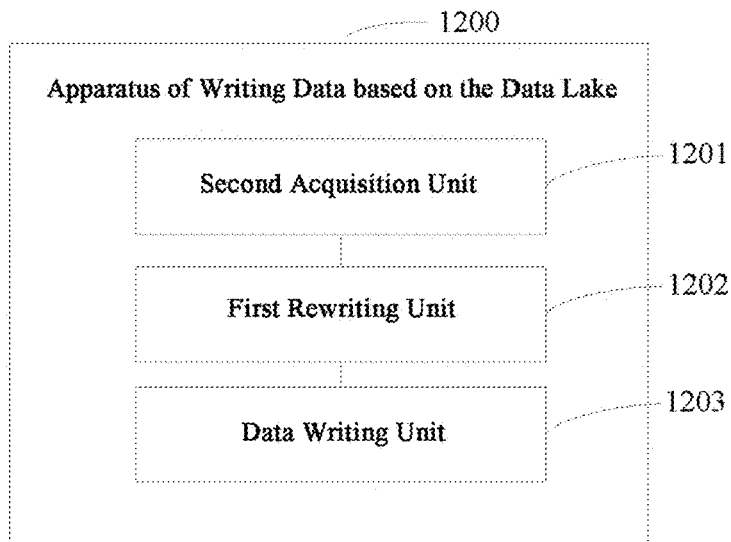
FIG. 12 is a schematic structural diagram of an apparatus of writing data based on a data lake provided by an embodiment of the present application.

Referring to FIG. 12, it can be seen that this figure is a schematic structural diagram of an apparatus of writing data based on a data lake provided by an embodiment of the present application.

The apparatus 1200 of writing data based on the data lake provided by the embodiment of the present application comprises:
- a second acquisition unit 1201, configured to acquire a first data writing request triggered by a second user, wherein the first data writing request is for requesting to write data into a second data table, and the first data writing request carries data column description information for the second data table;
- a first rewriting unit 1202, configured to, in accordance with a determination that the data column description information satisfies a preset expansion condition, and a determination that at least one second materialized column exists in the second data table, rewrite the first data writing request based on a materialized expression of the at least one second materialized column, to obtain a second data writing request, wherein the second materialized column is created using any implementation of the method of creating the materialized column based on the data lake provided by the embodiments of the present application; and
- a data writing unit 1203, configured to perform data writing on the second data table according to the second data writing request.

In a possible implementation, the first rewriting unit 1202 is specifically configured to: write the materialized expression of the at least one second materialized column into the first data writing request in sequence, according to a position order of the at least one second materialized column in the second data table, to obtain the second data writing request.

In a possible implementation, the apparatus 1200 of writing data based on the data lake further comprises:
- a fifth acquisition unit, configured to acquire data writing device description information; and
- a second determination unit, configured to determine the writing device to be used based on the data writing device description information; and
- the data writing unit 1203 is specifically configured to: determine a first writing task from the second data writing request; translate the first writing task according to a task description language of the writing device to be used, to obtain a second writing task, wherein the second writing task is for implementing data writing on the second data table; and send the second writing task to the writing device to be used, to cause the writing device to be used to execute the second writing task.

Based on the relevant content of the apparatus 1200 of writing data based on the data lake above, it can be seen that for the apparatus 1200 of writing data based on the data lake provided by the embodiment of the present application, after acquiring the first data write request triggered by the second user, if it is determined that the data column description information carried in the first data write request satisfies the preset extension condition, and it is determined that there is at least one second materialized column in the second data table, the first data write request is rewritten, according to the materialized expressions of these second materialized columns, to obtain the second data write request, at first, so that the second data write request carries the materialized expressions of these second materialized columns, so that an automatic rewriting process for the first data writing request can be realized; and then, according to the second data writing request, data writing is performed on the second data table to realize the user demand for data writing on the second data table. It can be seen that because the method of writing the materialized column provided by the embodiments of the present application can perform automatic rewriting processing for the data write request that lacks materialized column information, the rewritten data write request can carry this materialized column information. Therefore, on the premise that the second user does not know that the materialized columns exist in the second data table, the second user can also use the known common columns in the second data table to implement data writing for all data columns in the second data table, which is beneficial to improving user experience.

Based on the method of querying data based on the data lake provided by the method embodiments above, the embodiments of the present application further provide an apparatus of querying data based on a data lake, which will be explained and described below in conjunction with the accompanying drawings. It should be noted that, for technical details of the apparatus of querying data based on the data lake provided by the embodiments of the present application, please refer to the relevant content of the method of querying data based on the data lake above.

Figure 13:
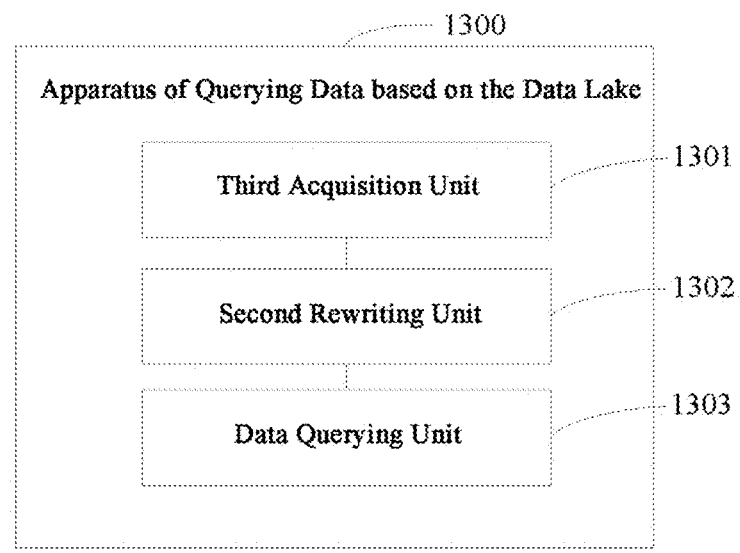
FIG. 13 is a schematic structural diagram of an apparatus of querying data based on a data lake provided by an embodiment of the present application.

Referring to FIG. 13, it can be seen that this figure is a schematic structural diagram of an apparatus of querying data based on a data lake provided by an embodiment of the present application.

The apparatus 1300 of querying data based on the data lake provided by the embodiment of the present application comprises:
- a third acquisition unit 1301, configured to acquire a first data query request triggered by a third user, wherein the first data query request is for requesting data query on a third data table;
- a second rewriting unit 1302, configured to, when at least one third materialized column exists in the third data table, rewrite the first data query request using the materialized column description information of the at least one third materialized column, to obtain a second data query request, wherein the third materialized column is created using any implementation of the method of creating the materialized column based on the data lake provided by the embodiments of the present application; and
- a data querying unit 1303, configured to perform data query on the third data table according to the second data query request.

In a possible implementation, the first data query request includes data query object description information. The materialized column description information includes a materialized expression and a materialized column identifier. The second rewriting unit 1302 is specifically configured to: in accordance with a determination that the materialized expression of at least one materialized column to be used of the at least one third materialized column matches at least one content to be used in the data query object description information, rewrite the first data query request using at least one materialized column identifier of the materialized column to be used, to obtain the second data query request.

In a possible implementation, the second rewriting unit 1302 is specifically configured to: replace the content to be used in the first data query request that matches the materialized expression of each materialized column to be used, with the materialized column identifier of each materialized column to be used, to obtain the second data query request.

In a possible implementation, the first data query request carries storage space query scope description information. The apparatus 1300 of querying data based on the data lake further comprises:
- a third determination unit, configured to determine at least one candidate materialized column set of the third data table based on the storage space query scope description information;
- a fourth determining unit, configured to determine at least one intersection materialized column based on the intersection between the at least one candidate materialized column set; and
- a materialized column filtering unit, configured to use the at least one intersection materialized column to select at least one target materialized column from the at least one materialized column to be used; and
- the second rewriting unit 1302 is specifically configured to: rewrite the first data query request using the materialized column identifier of the at least one target materialized column, to obtain the second data query request.

In a possible implementation, the apparatus 1300 of querying data based on the data lake further comprises:
- a materialized column deletion unit, configured to, in accordance with a determination that the preset association condition between the associated materialized column of the materialized column to be eliminated in the at least one materialized column to be used and the data column to be queried in the data query object description information is satisfied, and the associated materialized columns of the respective materialized columns to be used are not the data columns to be queried, delete the materialized column to be eliminated from the at least one materialized column to be used, to obtain at least one alternative materialized column, wherein the associated materialized column of the materialized column to be eliminated is a data column in the third data table that is within the materialized expression of the materialized column to be eliminated; and
- the second rewriting unit 1302 is specifically configured to: rewrite the first data query request using the materialized column identifier of the at least one alternative materialized column, to obtain the second data query request.

In a possible implementation, the apparatus 1300 of querying data based on the data lake further comprises:

- a sixth acquisition unit, configured to acquire the data query device description information; and
- a fifth determination unit, configured to determine the query device to be used based on the data query device description information; and
- the data querying unit 1303 is specifically configured to: determine the first query task from the second data query request; translate the first query task according to the task description language of the query device to be used, to obtain the second query task, wherein the second query task is for implementing data query on the third data table; and send the second query task to the query device to be used, to cause the query device to be used to execute the second query task.

Based on the relevant content of apparatus 1300 of querying data based on the data lake above, it can be seen that for the apparatus 1300 of querying data based on the data lake provided by the embodiments of the present application, after acquiring the first data query request triggered by the third user, if it is determined that there is at least one third materialized column in the third data table involved in the first data query request, the first data query request is rewritten, at first, based on the materialized column description information of these third materialized columns, to replace the materialized expressions of some third materialized columns recorded in the first data query request with the materialized column identifiers of these third materialized columns, to obtain the second data query request, so that the second data query request may involve some common columns and some materialized columns in the third data table; and then, data query is performed on the third data table according to the second data query request to realize the user demand for data query on the third data table, so that the purpose of using some materialized columns in the third data table to replace some common columns for data provision can be achieved, thereby effectively mitigating the adverse effects caused by directly using these common columns for data provision, and thus effectively improving the user's data query experience.

Based on the method of creating the materialized column based on the data lake, the method of writing data based on the data lake and the method of querying data based on the data lake provided by the method embodiments above, the embodiments of the present application further provide an information processing system based on a data lake, which will be explained and described below in conjunction with the accompanying drawings. It should be noted that, for technical details of the information processing system based on the data lake provided by the embodiments of the present application, please refer to the relevant content of the method of creating the materialized column based on the data lake, the method of writing data based on the data lake and the method of querying data based on the data lake above.

Figure 14:
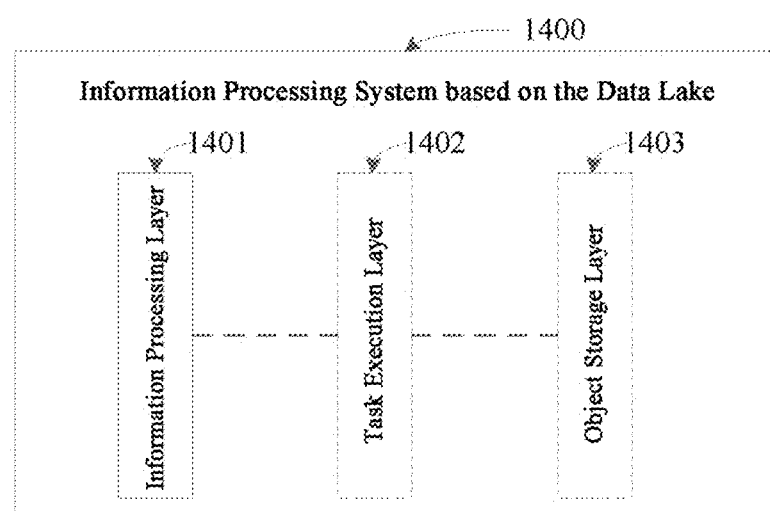
FIG. 14 is a schematic structural diagram of an information processing system based on a data lake provided by an embodiment of the present application.

Referring to FIG. 14, it can be seen that this figure is a schematic structural diagram of an information processing system based on a data lake provided by an embodiment of the present application.

In the information processing system 1400 based on the data lake provided by the embodiment of the present application, the system 1400 comprises an information processing layer 1401. Wherein the information processing layer 1401 is configured to execute any implementation of the method of creating the materialized column based on the data lake provided by the embodiments of the present application, or execute any implementation of the method of writing data based on the data lake provided by the embodiments of the present application, or execute any implementation of the method of querying data based on the data lake provided by the embodiments of the present application.

In a possible implementation, the system 1400 further comprises a task execution layer 1402 and an object storage layer 1403. Wherein the task execution layer 1402 comprises at least one task execution device. And the task execution layer 1402 is configured to execute tasks to be executed which is sent by the information processing layer 1401; and the object storage layer 1403 is configured to provide data storage space for the system.

In order to facilitate understanding of the working principle of the information processing system 1400 based on the data lake, some possible implementations of the information processing system 1400 will be described below.

In a possible implementation, the information processing layer 1401 is configured to acquire a materialized column creation request triggered by a first user, wherein the materialized column creation request is for requesting to create a first materialized column in a first data table. The materialized column creation request carries a materialized expression of the first materialized column. The materialized expression is for describing a data association relationship between the first materialized column and a target column in the first data table.

The information processing layer 1401 is further configured to create the first materialized column according to the materialized column creation request, wherein the first materialized column is used to replace the target column in providing data for a data query request carrying the materialized expression.

In a possible implementation, the information processing layer 1401 is specifically configured to create the first materialized column in the data storage space provided by the object storage layer 1403 according to the materialized column description information carried by the materialized column creation request, to cause the first materialized column to be stored in the data storage space, wherein the materialized column description information includes the materialized expression of the first materialized column.

In a possible implementation, the information processing layer 1401 is specifically configured to create metadata of the first materialized column in the data storage space, and store the materialized expression of the first materialized column into the metadata in a predefined description format.

In a possible implementation, the information processing layer 1401 is further configured to acquire the materialized column creation device description information.

The information processing layer 1401 is further configured to determine the creation device to be used in the task execution layer 1402 based on the materialized column creation device description information.

The information processing layer 1401 is specifically configured to determine a first creation task from the materialized column creation request; translate the first creation task according to the task description language of the creation device to be used, to obtain the second creation task, wherein the second creation task is for creating the first materialized column; and send the second creation task to the creation device to be used, to cause the creation device to be used to execute the second creation task.

In a possible implementation, the information processing layer 1401 is specifically configured to query the task execution device description information corresponding to the first request type from the preset mapping relationship in accordance with a determination that the materialized column creation request belongs to the first request type, and determine it as the materialized column creation device description information.

In a possible implementation, the information processing layer 1401 is specifically configured to extract the materialized column creation device description information from the materialized column creation request when the materialized column creation request carries the materialized column creation device description information.

In a possible implementation, the information processing layer 1401 is further configured to acquire the first data write request triggered by the second user, wherein the first data write request is for requesting to write data into the second data table; and the first data write request carries data column description information for the second data table.

The information processing layer 1401 is further configured to, in accordance with a determination that the data column description information satisfies the preset expansion condition, and a determination that at least one second materialized column exists in the second data table, rewrite the first data write request based on the materialized expression of the at least one second materialized column, to obtain the second data write request, wherein the second materialized column is created using any implementation of the method of creating the materialized column based on the data lake provided by the embodiments of the present application.

The information processing layer 1401 is further configured to perform data writing on the second data table according to the second data writing request.

In a possible implementation, the information processing layer 1401 is specifically configured to write the materialized expression of the at least one second materialized column into the first data writing request in sequence according to a position order of the at least one second materialized column in the second data table, to obtain the second data writing request.

In a possible implementation, the information processing layer 1401 is further configured to acquire data writing device description information.

The information processing layer 1401 is further configured to determine a writing device to be used in the task execution layer 1402 based on the data writing device description information.

The information processing layer 1401 is specifically configured to determine a first writing task from the second data writing request; translate the first writing task according to a task description language of the writing device to be used, to obtain a second writing task, wherein the second writing task is for implementing data writing on the second data table; and send the second writing task to the writing device to be used, so that the writing device to be used executes the second writing task.

In a possible implementation, the information processing layer 1401 is further configured to acquire a first data query request triggered by a third user, wherein the first data query request is for requesting data query on a third data table.

The information processing layer 1401 is further configured to rewrite, when at least one third materialized column exists in the third data table, the first data query request using the materialized column description information of the at least one third materialized column, to obtain a second data query request, wherein the third materialized column is created using any implementation of the method of creating the materialized column based on the data lake provided by the embodiments of the present application.

The information processing layer 1401 is further configured to perform data query on the third data table according to the second data query request.

In a possible implementation, the first data query request comprises data query object description information. And the materialized column description information comprises a materialized expression and a materialized column identifier.

The information processing layer 1401 is specifically configured to rewrite, in accordance with a determination that the materialized expression of at least one materialized column to be used of the at least one third materialized column matches at least one content to be used in the data query object description information, the first data query request using the materialized column identifier of at least one materialized column to be used, to obtain the second data query request.

In a possible implementation, the information processing layer 1401 is specifically configured to replace the content to be used in the first data query request that matches the materialized expression of each materialized column to be used with the materialized column identifier of each materialized column to be used, to obtain the second data query request.

In a possible implementation, the first data query request carries storage space query scope description information.

The information processing layer 1401 is further configured to determine at least one candidate materialized column set of the third data table based on the storage space query scope description information.

The information processing layer 1401 is further configured to determine at least one intersection materialized column based on an intersection between the at least one candidate materialized column set.

The information processing layer 1401 is further configured to select at least one target materialized column from the at least one materialized column to be used using the at least one intersection materialized column.

The information processing layer 1401 is specifically configured to rewrite the first data query request using the materialized column identifier of the at least one target materialized column, to obtain the second data query request.

In a possible implementation, the information processing layer 1401 is further configured to delete, in accordance with a determination that a preset association condition between an associated materialized column of the materialized column to be eliminated in the at least one materialized column to be used and a data column to be queried in the data query object description information is satisfied, and the associated materialized column of each of the materialized columns to be used is not the data column to be queried, the materialized column to be eliminated from the at least one materialized column to be used, to obtain at least one alternative materialized column, wherein the associated materialized column of the materialized column to be eliminated is the data column in the third data table that is within the materialized expression of the materialized column to be eliminated.

The information processing layer 1401 is specifically configured to rewrite the first data query request using the materialized column identifier of the at least one alternative materialized column, to obtain the second data query request.

In a possible implementation, the information processing layer 1401 is further configured to acquire data query device description information.

The information processing layer 1401 is further configured to determine a query device to be used based on the data query device description information.

The information processing layer 1401 is specifically configured to determine a first query task from the second data query request; translate the first query task according to a task description language of the query device to be used, to obtain a second query task, wherein the second query task is for implementing data query on the third data table; and send the second query task to the query device to be used, to cause the query device to be used to execute the second query task.

Based on the relevant content of the information processing system 1400 based on the data lake above, it can be seen that for the information processing system 1400 based on the data lake provided by the embodiments of the present application, at least one materialized column can be created for a data table first, such that these materialized columns are used for storing data related to common columns (for example, similar to high-frequency sub-columns such as "people.age" below) in the data table, such that when a user subsequently triggers a data query request for a common column, a materialized column can replace the common column to feed back the queried data to the user, and in this way, adverse effects (e.g., wasting IO resources, adding additional calculation, etc.) caused when the queried data is fed back to the user directly by the common column can be effectively overcome, such that the data query effect can be effectively improved, and the information processing effect for such data tables can thus be effectively improved.

Based on the content related to the materialized column above, it can be seen that the series of information processing processes achieved based on the materialized column provided in the embodiments of the present application can attain the beneficial effects shown in (1) to (5) below.

(1) It fundamentally solves the problem of low reading performance of native OLAP engines for nested type fields such as Map, Struct, Array, and Json; actual scenario testing can bring about an average performance improvement of 60%-90%, and the storage overhead is only 1.06%, specifically reflected in the following three aspects (1.1)-(1.3):

(1.1) avoiding invalid I/O and redundant calculations;

(1.2) supporting vectorized reading; and (1.3) supporting Filter PushDown.

(2) High ease of use: the input writing process and data query process for materialized columns are automatically completed by the engine; users only need to add/delete materialized columns based on business perspectives, specifically reflected in the following three aspects (2.1)-(2.3):

(2.1) The online table can transparentize online materialized column function, and the ETL tasks as well as downstream dependent tasks of the target table do not require any modification;

(2.2) It can adapt to the changing high-frequency sub-columns; the materialized columns are hidden from the downstream; the downstream tasks do not directly query the materialized columns; therefore, adding/deleting the materialized columns will not affect the downstream dependent tasks; and (2.3) Optimization for queries related to high-frequency sub-columns can be achieved optimally, avoiding issues present in business-side solutions.

(3) Low maintenance cost: there is no need to maintain an additional new table; as to storage costs, only the increased data of the materialized columns needs to be stored; as to computing costs, since the data recorded in the materialized column is calculated and written together with other data when the data is written to the data table as a whole, it is beneficial to reduce IO time consumption.

(4) a wide range of covered scenarios: in addition to optimizing nested types, materialized columns may also be created for some calculation formulas with high computational cost (e.g., a+a+1; or get_json_object, lower(name), number*100+1 and other calculation formulas), to avoid repeated calculations for each query.

(5) Low cost of OLAP engine access: for users, when they need to query materialized columns, they only need to write a set of SQL statements according to the SQL specifications applicable to the information processing layer 1401, and then they can query on multiple OLAP engines in the task execution layer 1402, without worrying about the dialect characteristics of different OLAP engines. For developers, expanding the underlying engine is convenient and low-cost, as it only requires translating and connecting the execution plan according to the dialect of the OLAP engine, without worrying about SQL parsing, verification and optimization and other modules, and it is easily decoupled and pluggable.

It should be noted that the term "first" in "first materialized column", the term "second" in "second materialized column", and the term "third" in "third materialized column" mentioned above in the present application are used only to distinguish which data table includes each of these materialized columns respectively, and have no other meaning. Similarly, the term "first" in "first data table", the term "second" in "second data table", and the term "third" in "third data table" mentioned above in the present application are used only to distinguish the data tables used in different execution processes, and have no other meaning.

In addition, the embodiments of the present application further provide an electronic device, which comprises a processor and a memory. Wherein the memory is configured to store instructions or computer programs, and the processor is configured to execute the instructions or computer programs stored in the memory to cause the electronic device to execute any implementation of the method of creating the materialized column based on the data lake provided by the embodiments of the present application, or execute any implementation of the method of writing data based on the data lake provided by the embodiments of the present application, or execute any implementation of the method of querying data based on the data lake provided by the embodiments of the present application.

Figure 15:
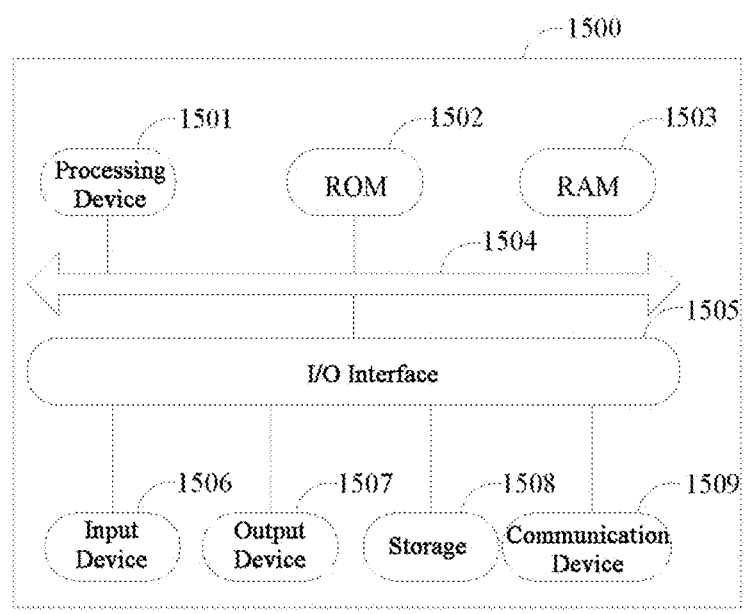
FIG. 15 is a schematic structural diagram of an electronic device provided by an embodiment of the present application.

Referring to FIG. 15, it can be seen that this figure is a schematic structural diagram of an electronic device 1500 provided by an embodiment of the present disclosure. The terminal device in the embodiments of the present disclosure may include, but is not limited to, mobile terminals such as mobile phones, laptop computers, digital broadcast receivers, PDAs (personal digital assistants), PADs (tablet computers), PMPs (portable multimedia players), vehicle-mounted terminals (e.g., vehicle-mounted navigation terminals), etc., as well as fixed terminals such as digital TVs, desktop computers, etc. The electronic device shown in FIG. 15 is merely an example and should not impose any limitation on the functionality and scope of use of the embodiments of the present disclosure.

As shown in FIG. 15, the electronic device 1500 may include a processing device (e.g., a central processing unit, a graphics processing unit, etc.) 1501, which may perform various appropriate actions and processing according to programs stored in the read-only memory (ROM) 1502 or programs loaded into the random access memory (RAM) 1503 from a storage 1508. Various programs and data required for the operation of the electronic device 1500 are also stored in RAM 1503. The processing device 1501, ROM 1502, and RAM 1503 are interconnected via a bus 1504. An input/output (I/O) interface 1505 is also connected to the bus 1504.

Generally, the following devices may be connected to the I/O interface 1505: input devices 1506, including, for example, a touch screen, touchpad, keyboard, mouse, camera, microphone, accelerometer, gyroscope, etc.; output devices 1507, including, for example, a liquid crystal display (LCD), speaker, vibrator, etc.; storages 1508, including, for example, magnetic tape, hard disks, etc.; as well as communication device 1509. The communication device 1509 may allow the electronic device 1500 to communicate wirelessly or via wired connections with other devices to exchange data. Although FIG. 15 shows the electronic device 1500 with various devices, it should be understood that it is not required to implement or include all the devices shown. Alternatively, more or fewer devices may be implemented or included.

Specifically, according to the embodiments of the present disclosure, the processes described above with reference to the flow chart can be implemented as a computer software program. For example, an embodiment of the present disclosure includes a computer program product comprising a computer program carried on a non-transitory computer-readable medium, the computer program containing program code for executing the method shown in the flow chart. In such an embodiment, the computer program can be downloaded and installed from a network via the communication device 1509, installed from the storage 1508, or installed from the ROM 1502. When this computer program is executed by the processing device 1501, the functions defined in the methods of the embodiment of the present disclosure are performed.

The electronic device provided in the embodiment of the present disclosure and the methods provided in the aforementioned embodiments belong to the same inventive concept, and technical details not exhaustively described in this embodiment can be referred to in the aforementioned embodiments, and this embodiment has the same beneficial effects as the aforementioned embodiments.

The embodiments of the present application further provide a computer-readable medium, having stored thereon instructions or computer programs which, when the instructions or computer programs are run on a device, causes the device to execute any implementation of the method of creating the materialized column based on the data lake provided by the embodiments of the present application, or execute any implementation of the method of writing data based on the data lake provided by the embodiments of the present application, or execute any implementation of the method of querying data based on the data lake provided by the embodiments of the present application.

It should be noted that the computer-readable medium described above in the present disclosure can be a computer-readable signal medium or a computer-readable storage medium, or any combination of the two. The computer-readable storage medium may be, for example, but is not limited to, an electrical, magnetic, optical, electromagnetic, infrared, or semiconductor system, apparatus or device, or any combination thereof. More specific examples of the computer-readable storage medium may include, but are not limited to: electrical connections having one or more wires, portable computer disks, hard disks, random access memory (RAM), read-only memory (ROM), erasable programmable read-only memory (EPROM or Flash memory), optical fiber, portable compact disk read-only memory (CD-ROM), optical storages, magnetic storages, or any suitable combination of the above. In the present disclosure, the computer-readable storage medium may be any tangible medium that contains or stores a program that can be used by or in combination with an instruction execution system, apparatus, or device. Furthermore, in the present disclosure, the computer-readable signal medium may include a data signal propagated in baseband or as part of a carrier wave having computer-readable program code embodied therein. Such propagated data signals may take many forms, including but not limited to electromagnetic signals, optical signals, or any suitable combination of the above. The computer-readable signal medium may also be any computer-readable medium other than the computer-readable storage medium that may send, propagate, or transmit a program for use by or in connection with an instruction execution system, apparatus, or device. Program code embodied on the computer-readable medium may be transmitted using any suitable medium, including but not limited to: wire, optical fiber cable, RF (radio frequency), etc., or any suitable combination of the foregoing.

In some embodiments, clients and servers may communicate using any currently known or future developed network protocol, such as HTTP (Hyper Text Transfer Protocol), and may be interconnected with any form or medium of digital data communication (e.g., a communication network). Examples of communication networks include a local area network ("LAN"), a wide area network ("WAN"), the internet, peer-to-peer networks (e.g., ad hoc peer-to-peer networks), and any currently known or future developed networks.

The computer-readable medium above may be included within the electronic device above, or it may exist separately and not be installed within the electronic device.

The computer-readable medium above carries one or more programs, which, when executed by the electronic device, enable the electronic device to perform the methods described above.

The computer program code for performing the operations of the present disclosure may be written in one or more programming languages, or a combination thereof, including but not limited to object-oriented programming languages such as Java, Smalltalk, C++, and conventional procedural programming languages such as "C" or similar programming languages. The program code may be executed entirely on the user's computer, partially on the user's computer, as a stand-alone software package, partially on the user's computer and partially on a remote computer, or entirely on a remote computer or server. In the case of a remote computer, the remote computer may be connected to the user's computer via any kind of network, including a local area network (LAN) or a wide area network (WAN), or may be connected to an external computer (e.g., connect via the Internet by utilizing an Internet service provider).

The flow charts and block diagrams in the accompanying drawings illustrate possible system architectures, functions, and operations of systems, methods, and computer program products according to various embodiments of the present disclosure. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the drawings. For example, two blocks shown in succession may actually be executed substantially concurrently, or the blocks may sometimes be executed in the reverse order, depending on the functionality involved. It is also to be noted that each block of the block diagrams and/or flow charts, and combinations of blocks in the block diagrams and/or flow charts, can be implemented by special-purpose hardware-based systems that perform the specified functions or operations, or by combinations of special-purpose hardware and computer instructions.

The units described in the embodiments of the present disclosure may be realized by way of software or may be realized by way of hardware, wherein the name of a unit/module does not constitute a limitation of the unit itself in a certain case.

The functions described above may be performed at least in part by one or more hardware logic components. For example, and without limitation, exemplary types of hardware logic components that may be used include: field programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, the machine-readable medium may be a tangible medium that can contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the above. More specific examples of the machine-readable storage medium include electrical connections based on one or more wires, portable computer disks, hard disks, random access memory (RAM), read-only memory (ROM), erasable programmable read-only memory (EPROM or Flash memory), optical fiber, portable compact disk read-only memory (CD-ROM), optical storages, magnetic storages, or any suitable combination of the above.

It should be noted that each embodiment in this specification is described in a progressive manner, and each embodiment focuses on its differences from other embodiments, and the same and similar parts between the various embodiments can be referred to each other. As for the systems or devices disclosed in the embodiments, since they correspond to the methods disclosed in the embodiments, the descriptions are relatively simple, and it is sufficient to refer to the description in the method section where relevant.

Furthermore, the embodiments of the present application further provide a computer program product which, when run on a terminal device, causes the terminal device to execute any implementation of the method of creating the materialized column based on the data lake provided by the embodiments of the present application, or execute any implementation of the method of writing data based on the data lake provided by the embodiments of the present application, or execute any implementation of the method of querying data based on the data lake provided by the embodiments of the present application.

It should be understood that, in the present application, "at least one (item)" means one or more, and "multiple" means two or more. "And/or" is used to describe the relationship between associated objects, indicating that three types of relationships may exist. For example, "A and/or B" may indicate: only A exists, only B exists, or both A and B exist simultaneously, where A and B may be singular or plural. The character "/" generally indicates an "or" relationship between the associated objects before and after it. "At least one of the following" or similar expressions refers to any combination of these items, including any combination of single or multiple items. For example, at least one of a, b, or c may indicate: a, b, c, "a and b", "a and c", "b and c", or "a and b and c", where a, b, and c may be singular or plural.

It should also be noted that, in this document, relational terms such as first and second are used solely to distinguish one entity or operation from another, and do not necessarily require or imply any such actual relationship or order between these entities or operations. Furthermore, the terms "comprise", "include", or any other variations thereof are intended to cover non-exclusive inclusion, so that a process, method, article, or apparatus that includes a series of elements not only includes those elements but also other elements not explicitly listed, or inherent elements of such a process, method, article, or apparatus. Without further limitations, an element defined by the phrase "comprising a . . ." does not exclude the presence of additional identical elements in the process, method, article, or apparatus that includes the element.

The steps of the method or algorithm described in conjunction with the embodiments disclosed herein may be implemented directly with hardware, a software module executed by a processor, or a combination of both. The software module may be placed in random memory (RAM), memory, read-only memory (ROM), electrically programmable ROM, electrically erasable programmable ROM, registers, hard disks, removable disks, CD-ROMs, or any other form of storage medium known in the art.

The description above of the disclosed embodiments enables those skilled in the art to realize or use the present application. Various modifications to these embodiments will be apparent to those skilled in the art, and the general principles defined herein may be realized in other embodiments without departing from the spirit or scope of the present application. Accordingly, the present application will not be limited to these embodiments shown herein, but will be subject to the broadest scope consistent with the principles and novel features disclosed herein.

The invention claimed is:

1. A method of querying data based on a data lake, comprising:
acquiring a first data query request triggered by a third user, wherein the first data query request is for requesting data query on a third data table;
rewriting, in accordance with a determination that at least one third materialized column exists in the third data table, the first data query request using materialized column description information of the at least one third materialized column to obtain a second data query request; and
performing data query on the third data table according to the second data query request;
wherein the third materialized column is created by:
acquiring a materialized column creation request triggered by a first user, wherein the materialized column creation request is for requesting to create the third materialized column in the third data table, the materialized column creation request carries a materialized expression of the third materialized column, and the materialized expression is for describing a data association relationship between the third materialized column and a target column in the third data table;
creating the third materialized column according to the materialized column creation request, wherein the third materialized column is used to replace the target column in providing data for a data query request carrying the materialized expression;
acquiring materialized column creation device description information; and
determining a creation device to be used based on the materialized column creation device description information;
wherein creating the third materialized column according to the materialized column creation request comprises:
determining a first creation task from the materialized column creation request;
translating the first creation task according to a task description language of the creation device to be used, to obtain a second creation task, wherein the second creation task is for implementing the creation of the third materialized column; and
sending the second creation task to the creation device to be used, to cause the creation device to be used to execute the second creation task;
wherein the first data query request comprises data query object description information, and the materialized column description information comprises the materialized expression and a materialized column identifier;
wherein rewriting the first data query request using the materialized column description information of the at least one third materialized column to obtain the second data query request comprises:
rewriting, in accordance with a determination that the materialized expression of at least one materialized column to be used of the at least one third materialized column matches at least one content to be used in the data query object description information, the first data query request using the materialized column identifier of at least one materialized column to be used to obtain the second data query request;
wherein the first data query request carries storage space query scope description information;
wherein the method further comprises:
determining at least one candidate materialized column set of the third data table based on the storage space query scope description information;
determining at least one intersection materialized column based on an intersection between the at least one candidate materialized column set; and
selecting at least one target materialized column from the at least one materialized column to be used using the at least one intersection materialized column; and
wherein rewriting the first data query request using the materialized column identifier of at least one materialized column to be used to obtain the second data query request comprises:
rewriting the first data query request using the materialized column identifier of the at least one target materialized column to obtain the second data query request.

2. The method according to claim 1, wherein rewriting the first data query request using the materialized column identifier of at least one materialized column to be used to obtain the second data query request comprises:
replacing the content to be used in the first data query request that matches the materialized expression of each materialized column to be used, with the materialized column identifier of each materialized column to be used, to obtain the second data query request.

3. The method according to claim 1, further comprising:

deleting, in accordance with a determination that an associated materialized column of the materialized column to be eliminated in the at least one materialized column to be used and a data column to be queried in the data query object description information satisfy a preset association condition, and a determination that the associated materialized column of each of the materialized columns to be used is not the data column to be queried, the materialized column to be eliminated from the at least one materialized column to be used, to obtain at least one alternative materialized column, wherein the associated materialized column of the materialized column to be eliminated is a data column in the third data table that is within the materialized expression of the materialized column to be eliminated, and wherein rewriting the first data query request using the materialized column identifier of at least one materialized column to be used to obtain the second data query request comprises:

rewriting the first data query request using the materialized column identifier of the at least one alternative materialized column, to obtain the second data query request.

4. The method according to claim 1, further comprising:

acquiring data query device description information; and determining a query device to be used based on the data query device description information;

wherein performing data query on the third data table according to the second data query request comprises:

determining a first query task from the second data query request;

translating the first query task according to a task description language of the query device to be used, to obtain a second query task, wherein the second query task is for implementing data query on the third data table; and sending the second query task to the query device to be used, to cause the query device to be used to execute the second query task.

* * * * *